United States Patent [19]

Yamamoto et al.

[11] Patent Number: 5,253,064
[45] Date of Patent: Oct. 12, 1993

[54] VIDEO CAMERA APPARATUS WITH ELECTRONIC ZOOM CONTROL AND METHOD THEREFOR

[75] Inventors: Naoki Yamamoto; Takuya Imaide; Hiroyuki Komatsu, all of Yokohama, Japan

[73] Assignees: Hitachi, Ltd., Tokyo; Hitachi Video Engineering, Kanagawa, both of Japan

[21] Appl. No.: 689,557

[22] Filed: Apr. 23, 1991

[30] Foreign Application Priority Data

Apr. 27, 1990 [JP] Japan .................. 2-110294

[51] Int. Cl.⁵ .................. H04N 3/223; H04N 5/232
[52] U.S. Cl. .................. 358/180; 358/227; 358/209
[58] Field of Search .......... 358/213.13, 224, 209, 358/180, 451, 22, 183, 160, 166, 21, 227, 222, 224, 213.26, 213.27, 41, 44; 364/571.01

[56] References Cited

U.S. PATENT DOCUMENTS

| | | | |
|---|---|---|---|
| 4,774,581 | 9/1988 | Shiratsuchi | 358/180 |
| 4,792,856 | 12/1988 | Shiratsuchi | 358/180 |
| 4,963,981 | 10/1991 | Todaka et al. | 358/213.13 |
| 4,991,022 | 2/1991 | Canfield et al. | 358/180 |
| 5,029,006 | 7/1991 | Katsumata et al. | 358/180 |
| 5,057,723 | 10/1991 | Matsuda | 358/180 |
| 5,083,208 | 1/1992 | Hatanaka | 358/180 |

FOREIGN PATENT DOCUMENTS 64-80168 3/1989 Japan .

*Primary Examiner*—James J. Groody
*Assistant Examiner*—Michael H. Lee
*Attorney, Agent, or Firm*—Antonelli, Terry, Stout & Kraus

[57] ABSTRACT

A video camera apparatus including a control circuit for producing an inverse number of $\alpha/\beta$ as control data based on an inputted arbitrary zooming ratio of $\beta/\alpha$; a sensor for outputting a sensor read signal which has been enlarged by arbitrary magnification in a vertical direction; a sensor drive circuit for driving said solid-state imaging element so as to output a sensor read signal which has been enlarged in the vertical direction by an arbitrary image enlarging magnification of $\beta/\alpha$ a digital signal processing circuit for separating the sensor read signal derived from the sensor into a luminance signal and a color signal to be outputted therefrom; and, an image processing circuit for receiving both the luminance signal and the color signal separated from the digital signal processing circuit and for performing interpolation in vertical and horizontal directions and also an enlargement in the horizontal direction of every luminance signal and color signal based on the control data $\alpha/\beta$.

12 Claims, 21 Drawing Sheets

FIG. 3A
PRIOR ART
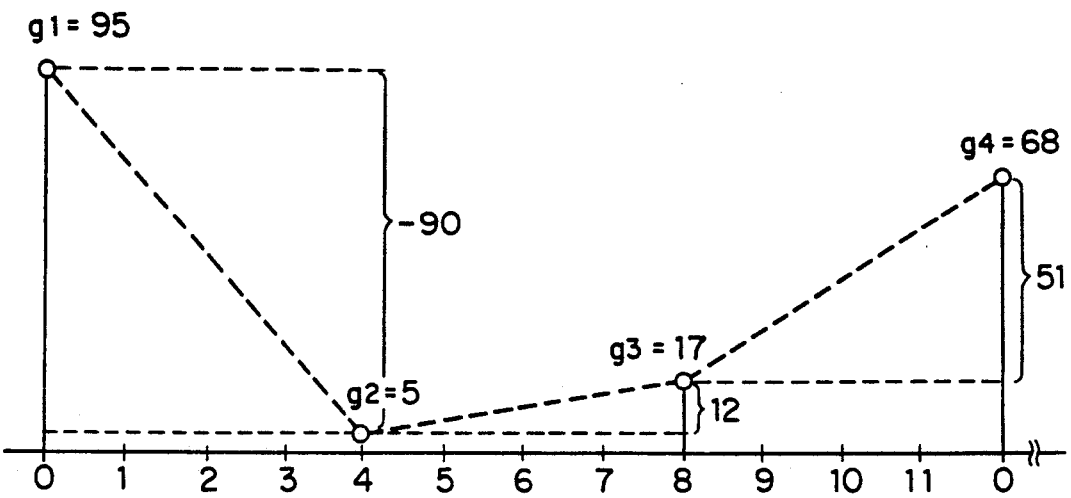
FIG. 3B
PRIOR ART
| i | 0 | 1 | 2 | 3 | 0 | 1 | 2 | 3 | 0 | 1 | 2 | 3 | 0 |
|---|---|---|---|---|---|---|---|---|---|---|---|---|---|
| δ | 0 | -23 | -45 | -68 | 0 | 3 | 6 | 9 | 0 | 13 | 26 | 38 | 0 |
FIG. 3C
PRIOR ART
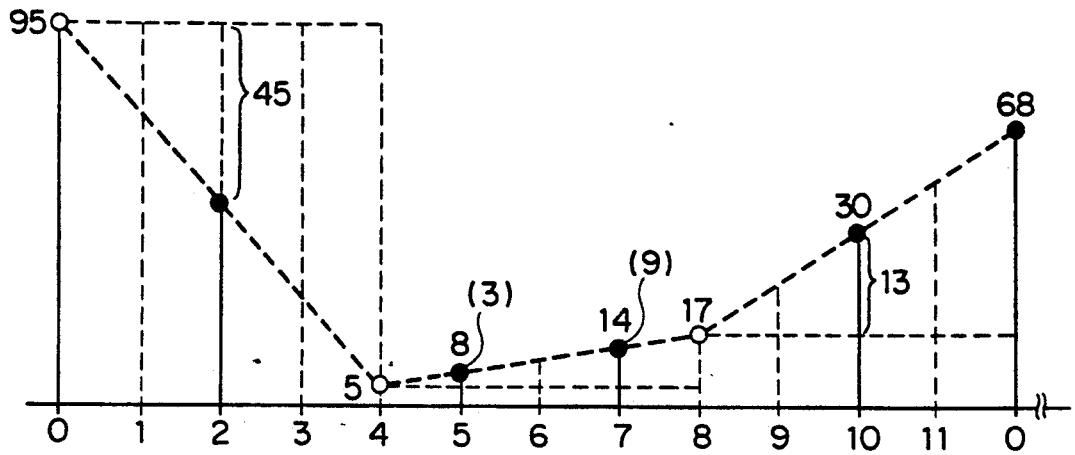

| MAGNIFI-CATION ($\beta/\alpha$) | $\alpha/\beta$ | DATA |
|---|---|---|
| 1 | 256/256 | 0 0 0 0 0 0 0 0 |
| 256/255 | 255/256 | 0 0 0 0 0 0 0 1 |
| ≀ | ≀ | ≀ |
| 2 | 128/256 | 1 0 0 0 0 0 0 0 |
| ≀ | ≀ | ≀ |
| 256 | 1/256 | 1 1 1 1 1 1 1 1 |

VIDEO CAMERA APPARATUS WITH ELECTRONIC ZOOM CONTROL AND METHOD THEREFOR

BACKGROUND OF THE INVENTION

The present invention generally relates to a video camera apparatus with employment of a solid-state imaging element. More specifically, the present invention is directed to a method and an apparatus suitable for electronically performing a zooming operation.

Conventionally, it has been known as a method for obtaining an electronically zooming image, that a picture or video signal outputted from a solid-state imaging element (referred to as a "sensor" hereinafter) is employed and an image is fitted to a desirable image size by newly adding pixels between the succeeding pixels in response to the zooming ratio and by dropping the pixel therefrom.

FIG. 1 is an explanatory diagram of a conventional technique such that when an enlargement process of 3/2 times is carried out, a weighted average is performed so as to achieve interpolation with better precision. FIG. 1(a) represents such a condition that pixel data on the luminance level every pixel in 1 horizontal scanning direction have been arranged as an example of no interplation. FIG. 1(b) indicates a timing pulse representative of a pixel corresponding position at 3/2 times. FIG. 1(c) represents such a state that image data which have been zoomed are arranged. The weighted average method according to the conventional technique will now be explained with reference to pixels "$g_1$" and "$g_2$" shown in FIG. 1(a). A timing pulse position signal "0" at a left end of FIG. 1(b) is separated from the image data $g_1$, and $g_2$ shown in FIG. 1(a) by $m_1=0$ and $n_1$, respectively. Also, a timing pulse position signal "1" at a left end is separated from these image data $g_1$, and $g_2$ by $m_2$ and $n_2$, respectively. As a result, interpolation data "$h_0$" and "$h_1$" indicative of pixel density levels in the respective timing pulse position signals "0" and "1" are obtained by the following equation (1):

$$h_0 = \frac{g_1 n_1 + g_2 m_1}{m_1 + n_1} = \frac{g_1 n_1 + g_2 \cdot 0}{0 + n_1} = g_1 \quad (1)$$
$$h_1 = \frac{g_1 n_2 + g_2 m_2}{m_2 + n_2}$$

FIG. 1(c) represents a zooming result by 3/2 times by way of the above-described linear interpolation.

It should be noted that when being outputted as actual image data, the timing positions among these pixels shown in FIG. 1(c) are equal to the timing positions shown in FIG. 1(a) and synchronized thereto so as to be outputted, and then are displayed as pixel data in the horizontal scanning direction where pixel "$h_0$" at a left end of FIG. 1(c) through ⅔ pixels have been enlarged unless a starting pixel in the horizontal scanning direction is specifically designated.

In accordance with this conventional method, the image data on the zoomed image can be calculated in better precision. However, to calculate the image data, the multiplication must be performed twice and the subtraction must be carried out one time. When such a conventional calculation is implemented in hardware, a complex circuit arrangement is necessarily required with expensive cost.

To solve these drawbacks of the above-described conventional method, another conventional method has been proposed in JP-A-64-80168 by employing a simpler circuit arrangement and which can interpolate pixels with arbitrary function. With reference to FIG. 2 this conventional method employs a ROM 1309 for previously storing a function used to interpolate pixels and also a RAM 1304 capable of arbitrarily rewriting interpolation addresses in accordance with a zooming ratio. FIG. 2 is a schematic block diagram for implementing this conventional zooming method, and FIGS. 3A to 3C represent explanatory diagrams.

FIG. 3A represents inputted image data ($g_1=95$, $g_2=5$, $g_3=17$ and $g_4=68$); FIG. 3B represents data $\gamma$ for interpolating each division position $i=0$ to 3 in case of division number $\gamma=4$; and FIG. 3C represents output data which has been interpolated.

In FIG. 2, the linear interpolation when continuous picture data are inputted is explained as follows. The pixels $g_1 \rightarrow g_2 \rightarrow g_3$ are inputted into an input line 1301 shown in FIG. 2 and also pixels $g_2 \rightarrow g_3 \rightarrow g_4$ positioned adjacent to these pixels are inputted into another input line 1302 in synchronization therewith, and image or picture data "h" which has been enlarged and interpolated as represented by an equation (2) is outputted:

$$h = g_n + \delta \quad (2)$$

$$\delta = INT\left\{ \left( \frac{g_{n+1} - g_n}{\gamma} \right) i \right\}, \quad (3)$$

where symbol INT { } is an integer obtained by rounding off values.

It should be noted that in the case when the zooming ratio of $\beta/\alpha$ of the image is set to 5/3 times and the dividing ratio $\gamma$ (integer) among the pixels is selected to be 4, an integer "i" indicative of a read address for the interpolation data is represented by $0 \leq i < \gamma$, namely a value within a range of $i=0$ to 3. As a consequence for the pixels $g_1$ to $g_4$, data produced by interpolation corresponding to $i=0$ to 3 is equal to values obtained from the above-described equation (3), i.e., [0, −23, −45, −68, 0, 3, 6, 9, 0, 13, 26, 38, 0].

First, the read address "i" of the above-described interpolation data is set via a data input line 1305 from microcomputer and to the RAM 1304.

It should be understood that this read address is present in the range of $i=0$ to 3, as described above, and is equal to an integer determined by the following equation (4);

$$i = INT\left( \frac{k\alpha\gamma}{\beta} \right) MDD\gamma \quad (4)$$

where symbol INT ( ) indicates an integer obtained by rounding off values, and symbol INT( )MDD$\gamma$ denotes a remainder of INT( )/$\gamma$. An integer "k" corresponds to $k=0$ to $(\beta-1)$, namely 0 to 4. In the above case, $i=0, 2, 1, 3, 2$.

Subsequently, the pixel data $g$ and $g_{n+1}$ which have been inputted into the input lines 1301 and 1302 are inputted into the substracter 1306, a calculation on $\Delta g = g_{n+1} - g_n$ is performed, and then a calculation result is outputted to the output line 1307. On the other hand, in response to values of the counter 1308 which performs the counting operation in synchronism with the timings at which the interpolated pixels are outputted, values of "i" (i=0, 2, 1, 3, 2) derived from the RAM 1304 are sequentially read out, and are inputted as read addresses of the ROM 1309 in combination with the above-described pixel "Δg". As a result, the read data for interpolating the pixels correspond to each of i=0, 2, 1, 3, 2, and the increased data for interpolation [0, −45, 3, 9, 26] are successively read and then inputted into the adder 1310. On the other hand, in synchronism with this interpolated data, pixel data ($g_1 = 95$, $g_2 = 5$, $g_3 = 17$, $g_4 = 68$) which has been inputted from the input line 1301 are also inputted to the adder 1310, the calculation as defined by the equation (1) is performed, and then the calculation result is outputted to the output line 1303. As a consequence, the interpolated output data to the output line 1303 is expressed by formula (5):

$$[95, 95, 5, 5, 17] + [0, -45, 3, 9, 26] = (95, 50, 8, 14, 43] \quad (5).$$

In the above-identified first item of prior art, there are problems with expensive hardware and complex circuitry. In the above-identified second item of prior art, these conventional problems could be solved by employing both RAM and ROM in simple hardware. However, this second item of prior art has another problem in that when the complex calculation is carried out with the RAM and ROM, the software becomes complex and a calculation speed is delayed.

SUMMARY OF THE INVENTION

A first object of the present invention is to provide a calculation method and a video camera apparatus having hardware for outputting arbitrary interpolated output data by applying simple data thereto.

As in the above-described prior art, when the interpolation is performed, there is a problem that a sharpness (resolution) of an image deteriorates because of interpolation.

A second object of the present invention is to provide a video camera capable of preventing deterioration in a sharpness (resolution) caused by the above-described interpolation.

A third object of the present invention is to provide a video camera apparatus capable of arbitrarily moving a region of a picture signal outputted by a zooming operation within a region of the above-described solid-state imaging element.

To achieve the above-described object, the present invention employs an inverse number $\alpha/\beta$ of a desired zooming ratio $\beta/\alpha$ as magnification data, and produces interpolated data with a multiplier and an adder.

The present invention employs means for varying an amount of enhancement (intensity of contour signal) for a picture signal which has not been interpolated.

The present invention employs means for separately reading an image in a horizontal direction and a vertical direction during a zooming operation, and for setting timing.

In accordance with the above-described method of the present invention, interpolated data required for the zooming operation may be zoomed up at an arbitrary magnification by executing a series of calculations on the pixel data positioned adjacent to the interpolated data under a condition such that the inverse number $\alpha/\beta$ of the zooming ratio is used as a constant.

According to the present invention, deterioration in a sharpness (resolution) caused by the interpolation is prevented by changing the amount of enhancement for the picture signal which has not been interpolated in connection with the zooming ratio.

Furthermore, when performing the zooming operation, the scanning region of the output region may be arbitrarily set by independently controlling the read timing in the horizontal and vertical directions.

BRIEF DESCRIPTION OF THE DRAWINGS

FIGS. 1, 2, 3A to 3C illustrate conventional zooming techniques;

DESCRIPTION OF THE PREFERRED EMBODIMENTS

The preferred embodiments of the present invention are described as follows.

Figure 1:
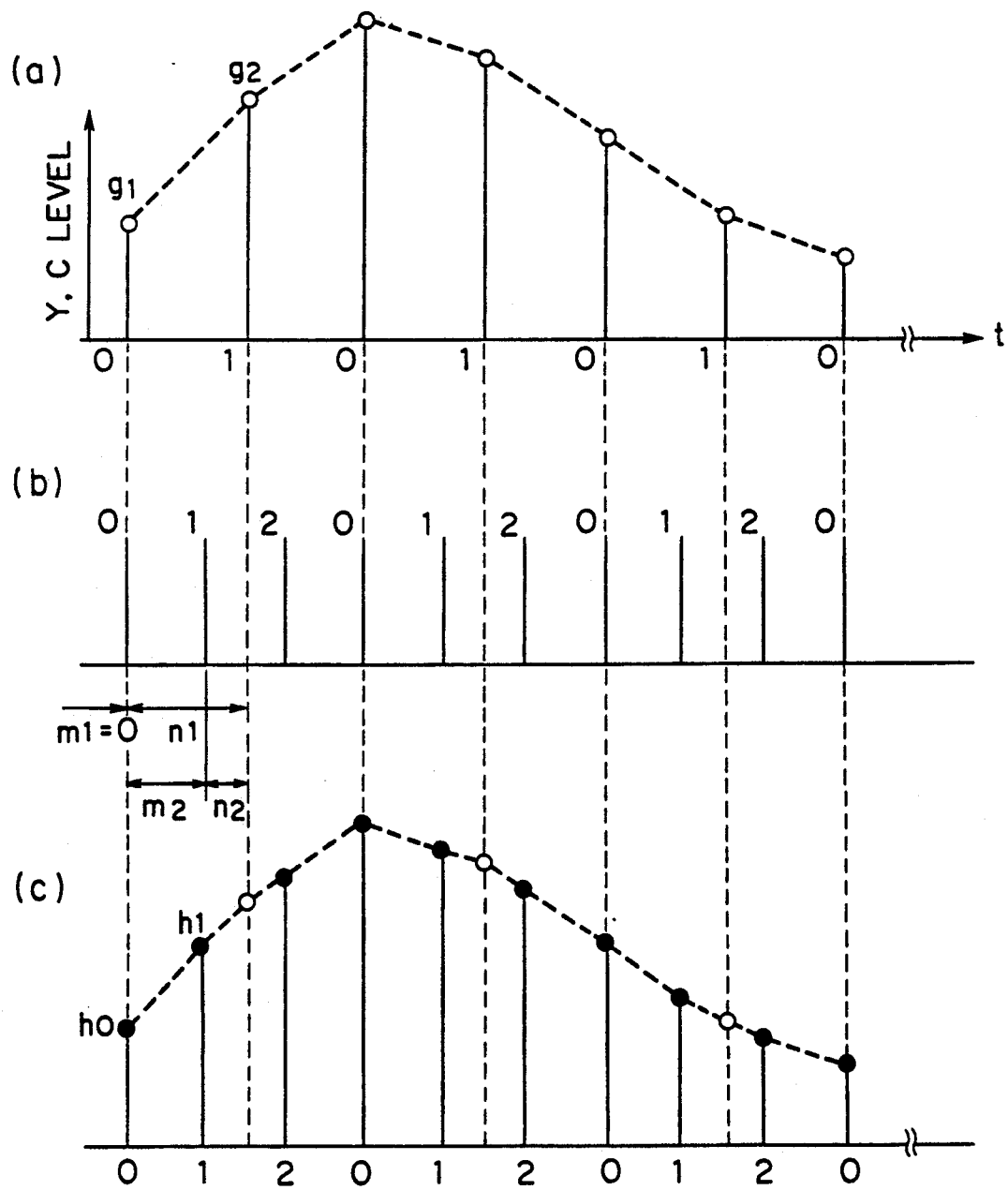
Figure 2:
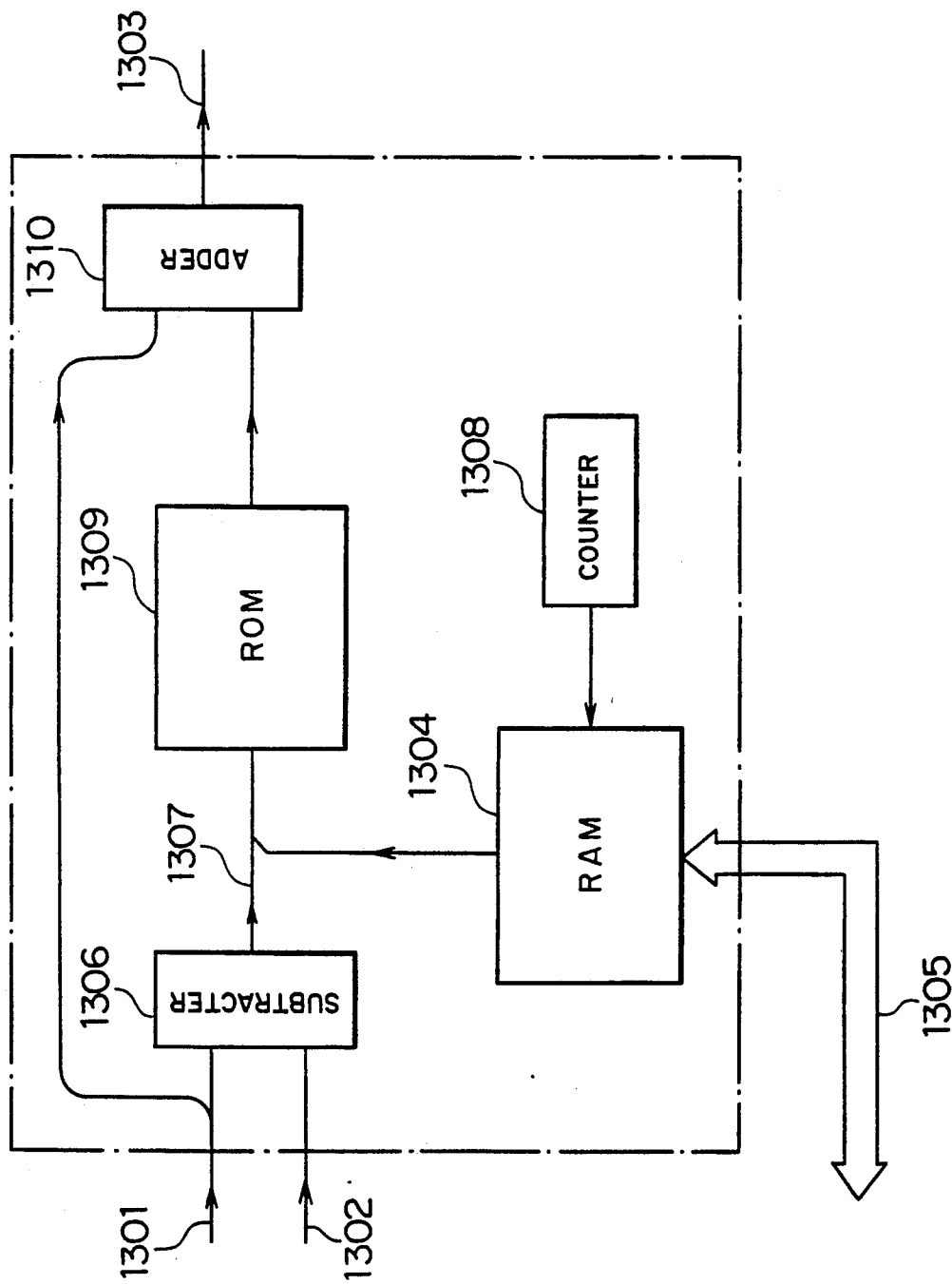
Figure 4:
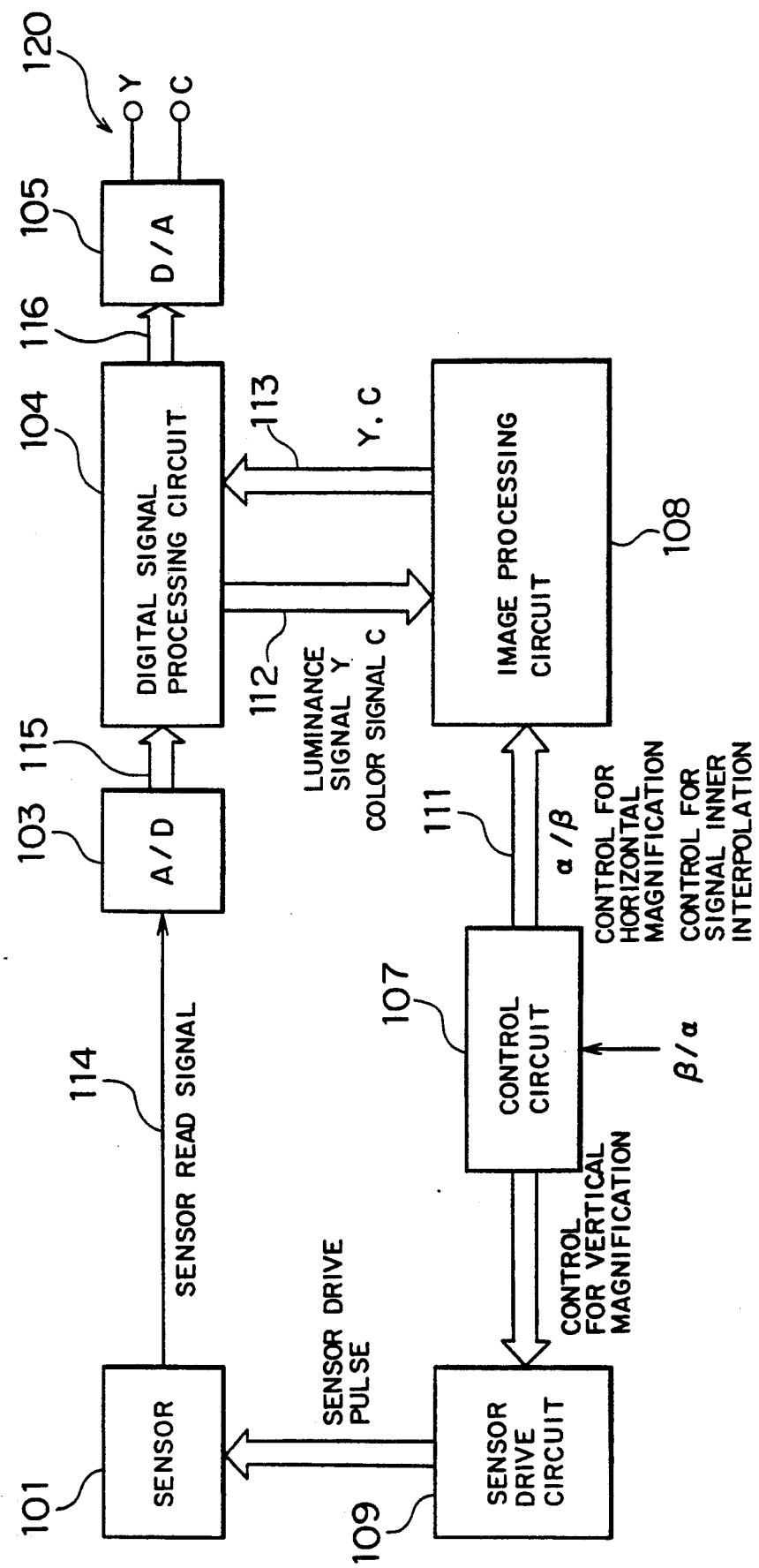
FIG. 4, is a schematic block diagram for showing an overall image processing apparatus according to an embodiment of the present invention.

FIG. 4 represents a camera system having an electronic zooming function according to a first preferred embodiment of the present invention. An operating method of this camera system will now be described.

In FIG. 4, reference numeral 101 indicates a sensor for outputting an image signal of a photographed image; reference numeral 103 indicates an A/D converter for analog-to-digital conversion of a sensor read signal 114 outputted from the sensor 101, which has been enlarged along a vertical direction; reference numeral 104 denotes a digital signal processing circuit for converting a digital sensor read signal 115 outputted from the A/D converter 103, into a digital picture signal consisting of a Y (luminance) signal and a C (color) signal; and reference numeral 105 represents a D/A converter for digital-to-analog conversion of the digital picture signal outputted from the digital signal processing circuit 104 into a corresponding analog picture signal, to produce a picture (video) signal 120 from the D/A converter 105. Reference numeral 108 indicates an image processing circuit for performing an interpolation on the digital picture signal in both horizontal and vertical directions, and also for enlarging the picture signal 112 derived from the digital signal processing circuit 104 in the horizontal direction; reference numeral 107 indicates a control circuit for controlling the image processing circuit 108; and reference numeral 109 is a drive circuit for the sensor 107.

In FIG. 4, when an image signal is zoomed at a zooming ratio of $\beta/\alpha$ inputted by a proper inputting means (not shown) to the control circuit 107, the control circuit 107 produces a data image signal 111 with a ratio of $\alpha/\beta$, and outputs this data signal to the image processing circuit 108. The sensor drive circuit 109 outputs a sensor drive pulse in accordance with a known method for performing an enlargement process in the vertical direction in accordance with the zooming ratio of $\beta/\alpha$ inputted into the control circuit 107, and the sensor read signal 114 is outputted from the sensor 101, which has been enlarged by the ratio of $\beta/\alpha$ in the vatical direction. The sensor read signal 114 from the sensor 101 is separated into a luminance (Y) signal and a color (C) signal by the A/D converter 103 and digital signal processing circuit 104 and the luminance and color signals are inputted into the image processing circuit 108 so that both the digital Y and C signals are processed by the data signal 111 of the ratio $\alpha/\beta$ with respect to the enlargement in the horizontal direction, and interpolations in both the horizontal and vertical directions. Thus, the digital Y and C signals 113 which have been enlarged in the horizontal direction and interpolated in both horizontal and vertical directions are outputted via the digital signal processing circuit 104 and D/A converter 105 as interpolated picture signals.

Figure 5:
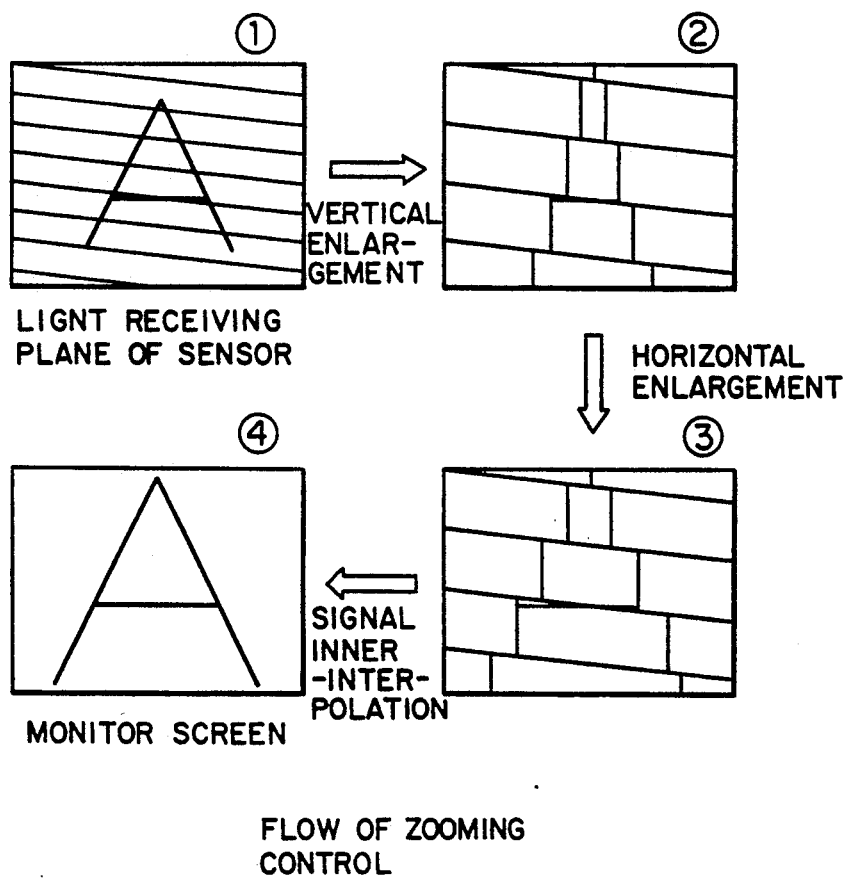
FIG. 5 illustrates steps for a vertical enlargement, a horizontal enlargement and an interpolation between horizontal and vertical directions, which are processed in the circuit block diagram of FIG. 4.

As represented in FIG. 5, in a camera apparatus according to this preferred embodiment of the invention, an image signal (an image indicated by ①) of an image focused onto a light receiving plane of the sensor is inputted to the image processing circuit 108 as a vertically-enlarged image signal (an image signal indicated by ②) after read out from the sensor 101. Thereafter the horizontal enlargement process (an image signal represented by ③) and the vertical interpolation and horizontal interpolation processes are carried out in the image processing circuit 108. As a result, image data (an image indicated by ④) is enlarged by the zooming ratio of $\beta/\alpha$ in both the vertical and horizontal directions and interpolation is produced.

Figure 6A:
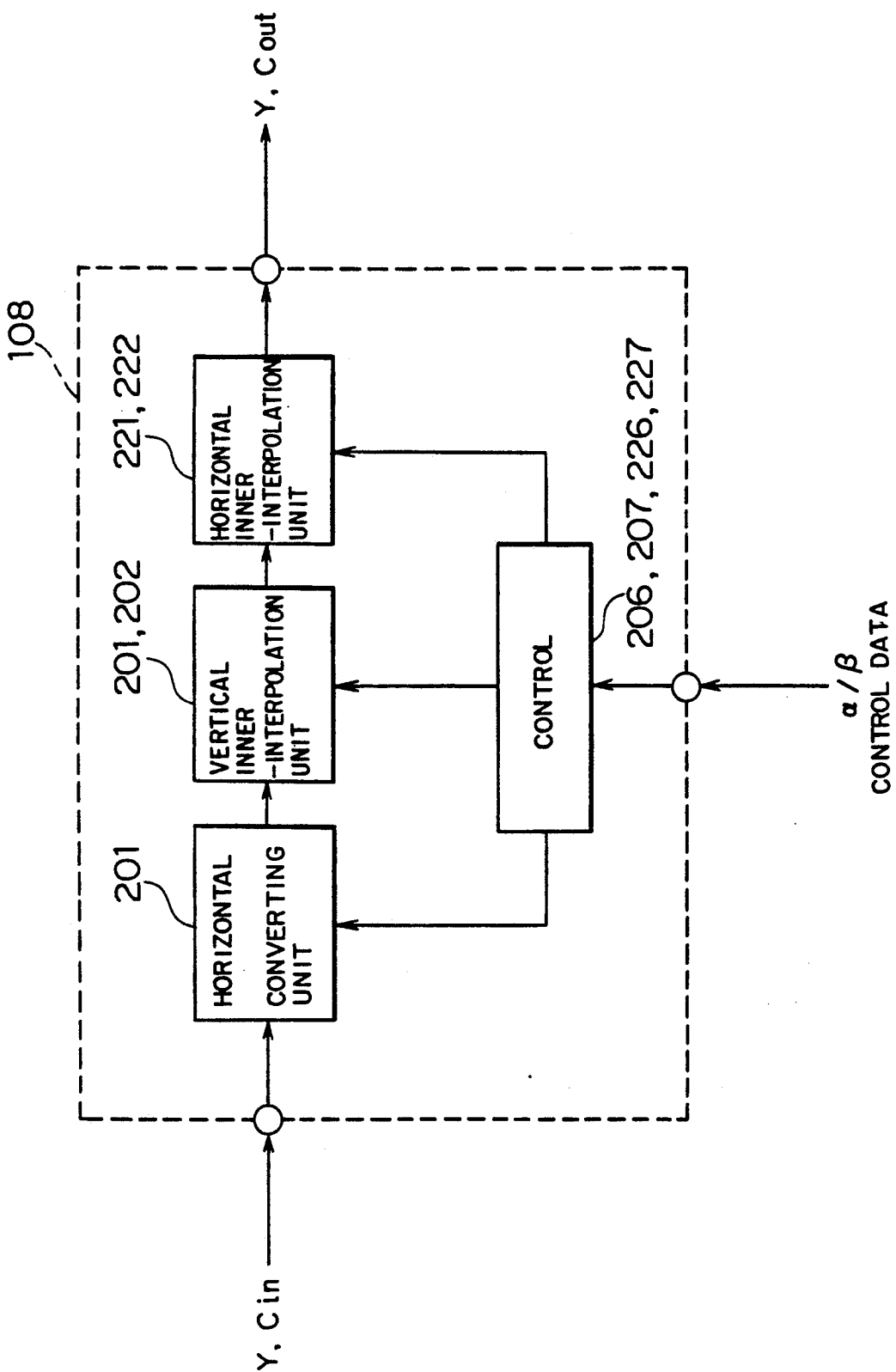
FIG. 6A is a block diagram of an internal arrangement of the image processing apparatus 108 of FIG. 4.
Figure 6B:
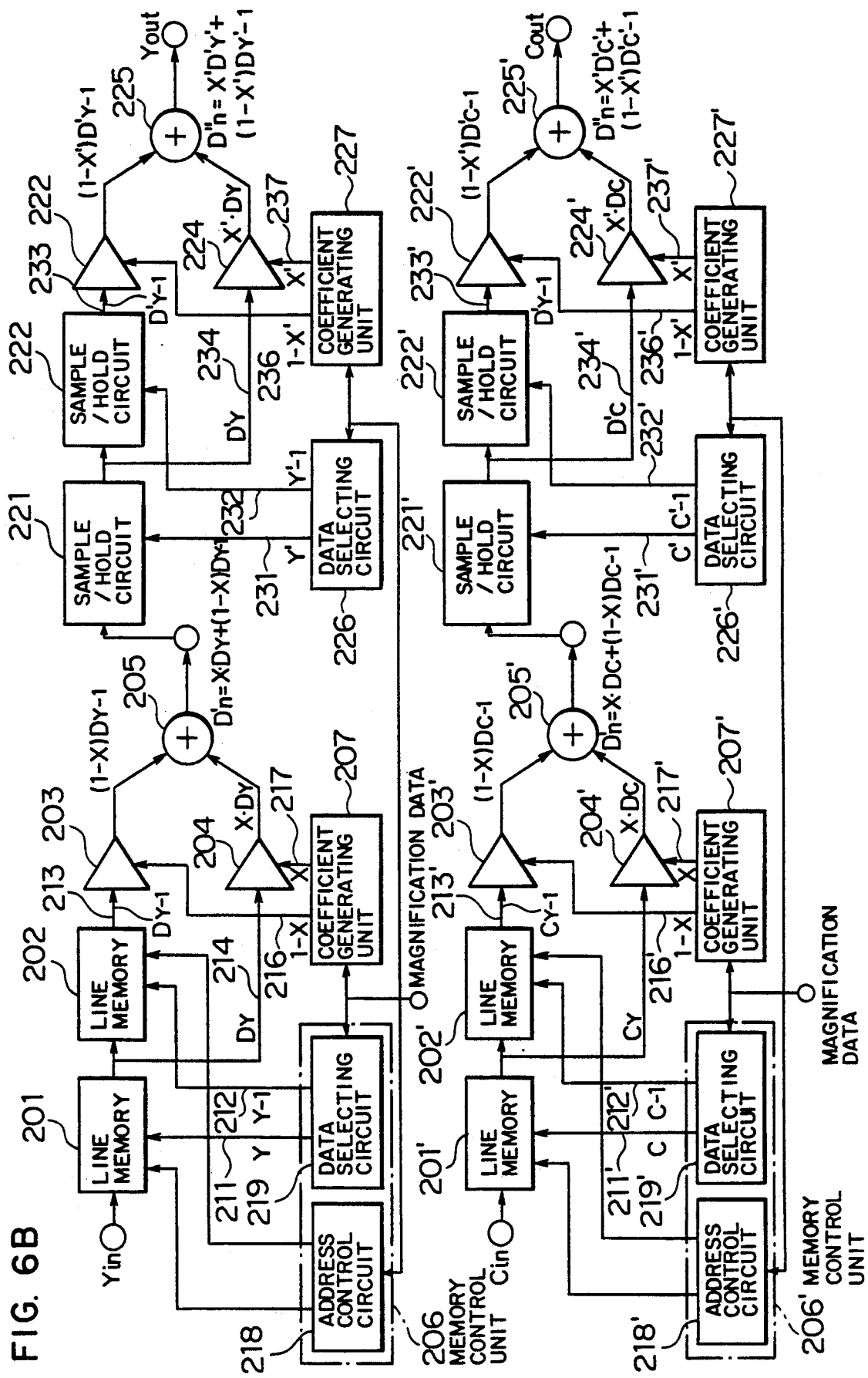
FIG. 6B is a block diagram representing in detail processing of both a luminance signal and a color (chrominance) signal of the image processing apparatus 108 of FIG. 4.

In FIGS. 6A and 6B, detailed arrangements of the image signal processing circuit 108 represented in FIG. 4 are illustrated. Methods for enlarging an image in the horizontal direction, and for performing an interpolation in the vertical and horizontal directions will now be explained with reference to FIGS. 7, 8 and 9A, 9B.

Figure 7:
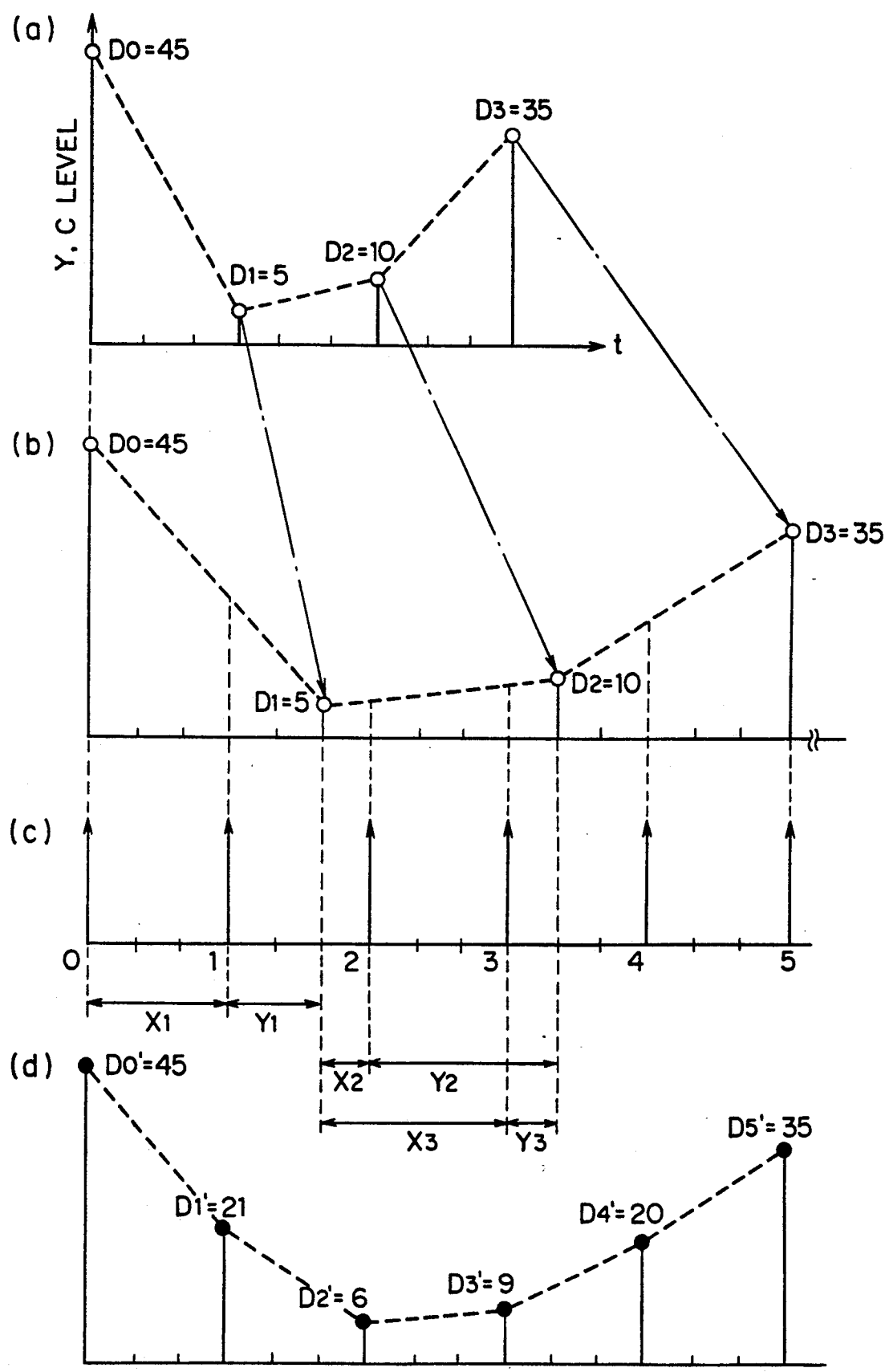
FIG. 7 illustrates processing of a data sample for enlargement and interpolation of a luminance signal and color signal in the vertical and horizontal directions.

First, a description is made of the enlargement and interpolation process in the vertical direction. FIG. 7 represents data $D_0$, $D_1$, $D_2$ and $D_3$ (image ① in FIG. 5) of the luminance signals of every horizontal scanning line before a zooming process is performed which correspond to the image focused on the imaging plane of the sensor 101. FIG. 7b represents both positions of the horizontal scanning lines $D_0$, $D_1$, $D_2$, $D_3$ of the sensor read signal 114 (signal ② of FIG. 5) and levels thereof in which the luminance signals of FIG. 7A have been enlarged by the ratio of $\alpha/\beta$ in the vertical direction by simply inserting the blanking of the horizontal scanning line. FIG. 7C represents timing pulses indicative of the position of the horizontal scanning line for the sensor read signal 114 in which the above-described signal of FIG. 7B is interpolated by the zooming ratio of $\beta/\alpha = 5/3$ in the image processing circuit 108 in the vertical direction. FIG. 7D represents data of the positions of the horizontal scanning lines $D_{0'}$, $D_{1'}$, $D_{2'}$, $D_{3'}$, $D_{4'}$ and $D_{5'}$, and the signal levels thereof which have been interpolated in the vertical direction.

To calculate values of the data of the luminance signals for the horizontal scanning lines $D_{0'}$, $D_{1'}$, $D_{2'}$, $D_{3'}$, $D_{4'}$ and $D_{5'}$ when a weighted average method similar to the above-described prior art is employed, the timing pulse position signal 1 shown in FIG. 7C is positioned apart from the image data $D_0$ and $D_1$ by $X_1$ and $Y_1$, respectively. Similarly, the timing pulse position signal 2 is positioned from the image data $D_1$ and $D_2$ by $X_2$ and $Y_2$, respectively. The timing pulse position signal 3 is positioned from the image data $D_1$, and $D_2$ and by $X_3$ and $Y_3$, respectively. As a result, interpolated data $D_{1'}$, $D_{2'}$ and $D_{3'}$ may be obtained in equations similar to the equation (1):

$$D_{1'} = \frac{D_0 Y_1 + D_1 X_1}{X_1 + Y_1} \tag{6}$$

$$D_{2'} = \frac{D_1 Y_2 + D_2 X_2}{X_2 + Y_2} \tag{7}$$

$$D_{3'} = \frac{D_1 Y_3 + D_2 X_3}{X_3 + Y_3} \tag{8}$$

Assuming now that $X_1 + Y_1 = X_2 + Y_2 = X_3 + Y_3 = \gamma$ the above-described equations (6), (7) and (8) are given as follows:

$$D_{1'} = \left(1 - \frac{X_1}{\gamma}\right) D_0 + \frac{X_1}{\gamma} D_1 \tag{9}$$

$$D_{2'} = \left(1 - \frac{X_2}{\gamma}\right) D_1 + \frac{X_2}{\gamma} D_2 \tag{10}$$

$$D_{3'} = \left(1 - \frac{X_3}{\gamma}\right) D_1 + \frac{X_2}{\gamma} D_2 \tag{11}$$

Similarly, the interpolated data may be sequentially calculated at the timings shown in FIG. 8 as follows: $D_{0'} = 45$; $D_{1'} = 21$; $D_{2'} = 6$; $D_{3'} = 9$; $D_{4'} = 20$ and $D_{5'} = 35$, As a consequence, if arbitrary interpolated picture data $D_{n'}$ is produced based upon picture data adjacent thereto with employment of the zooming ratio of $\beta/\alpha$, it may be obtained by an equation (12) and also equations (13), (14) for defining coefficients thereof:

$$D_{n'} = X D_Y + (1 - X) D_{Y-1} \tag{12}$$

$$X = n \frac{\alpha}{\beta} - INT1\left(n \frac{\alpha}{\beta}\right) \tag{13}$$

$$Y = INT2\left(n \frac{\alpha}{\beta}\right) \tag{14}$$

, where symbol "INT 1( )" denotes an integer obtained by cutting off any number below a decimal point; and symbol "INT 2( )" indicates an integer obtaining by counting fractions as 1.

As a consequence, although the equations (13) and (14) represent multiplication between the integer "n" and the inversion ratio of $\alpha/\beta$ for the zooming ratio, the coefficients X and Y employed in the equation (12) may be readily and practically calculated by performing such a calculation [n $\alpha/\beta = (n-1) \alpha/\beta \div \alpha/\beta$] in which the ratio $\alpha/\beta$ is successively added in accordance with the successive increase of the integer "n". Then, both a selection of data $D_Y$, $D_{Y-1}$ required for forming the interpolated data, and a calculation on an arithmetic coefficient "X" may be performed.

It should be noted that the Data $D_Y$ and $D_{Y-1}$ required for the enlargement and interpolation in the vertical direction correspond to luminance and color signal data (Y, C) of the horizontal scanning line, whereas the data $D_Y$ and $D_{Y-1}$ required for the enlargement and interpolation in the horizontal direction correspond to the luminance and color signal data (Y, C) on each pixel within a single horizontal scanning line.

Figure 8:
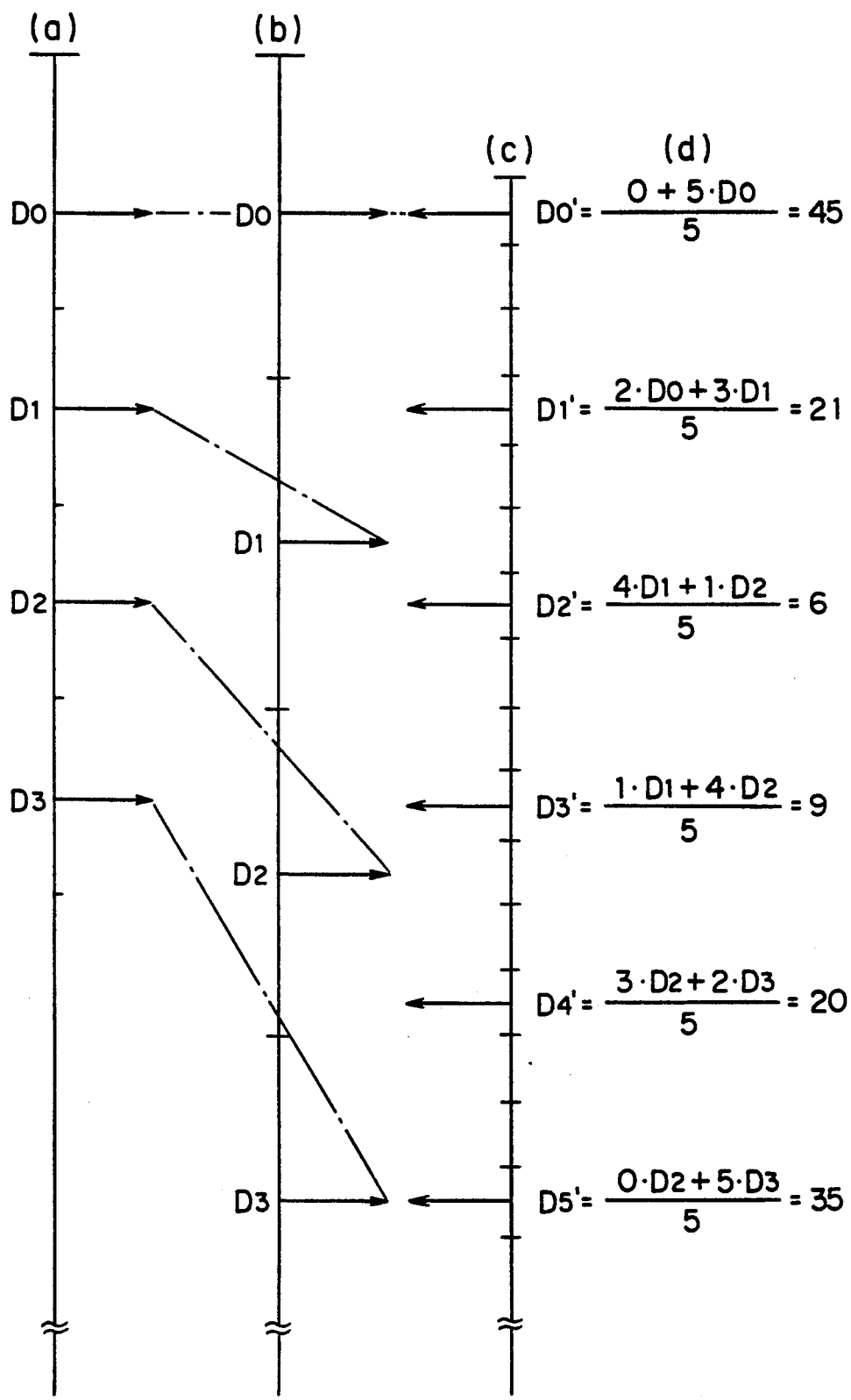
FIG. 8 represents data timings and output values before and after the interpolation process.

As a consequence, in the examples shown in FIGS. 7 and 8 for the enlargement and interpolation in the vertical direction, the data $D_0$, $D_1$, $D_2$, and $D_3$ were handled as data of the luminance and color signals for the respective horizontal scanning lines and the interpolated data $D_{0'}$, $D_{1'}$, $D_{2'}$, $D_{3'}$ and $D_{4'}$ were handled as the data of the luminance and color signals of the horizontal scanning lines which had been processed by the inner interpolation in the vertical direction. Similarly, in case of the interpolation in the vertical direction, the data $D_0$, $D_1$, $D_2$ and $D_3$ may be processed as the data of the luminance signal and color signal within a single horizontal scanning line and the data $D_{0'}$, $D_{1'}$, $D_{2'}$, $D_{3'}$, $D_{4'}$ and $D_{5'}$ of the luminance signal and color signal which have been enlarged in the horizontal direction and interpolated are produced.

The image processing circuit 108 is represented in FIG. 6A has a horizontal time axis converting unit 201' for enlarging the data which is inputted therein from the digital signal processing circuit 104 and has been enlarged in the vertical direction; vertical interpolating units 211 and 212 for interpolating this output signal in the vertical direction; horizontal interpolating units 221, 222 for interpolating the output signal in the horizontal direction; and controllers 206, 207, 226 and 227 for executing control of enlargement and interpolation with respect to these units in response to control data "60 /$\beta$" supplied from a control circuit 107. In the image processing circuit 108, since both the luminance and color signal data (Y, C) are processed in the respective enlarging and interpolating circuits which are independently provided for each of the luminance signal data and color signal data, only processing for the luminance signal will now be described with reference to a detailed circuit block diagram shown in FIG. 6B.

In this FIG. 6B, a luminance signal processing circuit is employed at the upper part and a color signal processing circuit is employed at the lower part. The luminance signal Yin is inputted into the luminance signal processing circuit and a luminance signal $D''n = Y'D'_y + (1-X') D_{y-1}$ is produced by enlarging this luminance signal Yin in the horizontal direction and also interpolating the luminance signal Yin in both the horizontal and vertical directions. The color signal Cin is inputted in the color signal processing circuit and a color signal $D''n = X'D'_{c'} + (1-X')D_{c'-1}$ is produced by enlarging color signal Cin in the horizontal direction and by interpolating the color signal Cin in both the horizontal and vertical directions. It should be noted that in the luminance signal processing circuit employed in the upper half of the image processing circuit 108 the luminance signals (picture signals) from the digital signal processing circuit 104 for every horizontal scanning line are successively inputted into line memories 201 and 202.

The memory control circuit 206 and a coefficient generating unit 207 for controlling both writing and reading operations of these line memories 201 and 202 has an inverse number ($\alpha/\beta$) of the zooming ratio supplied as magnification data. The memory control circuit 206 is constructed of an address control circuit 218 for performing an address control of reading and writing for two line memories 201 and 202 and a data selecting circuit 219 for performing a data selection of reading and writing (namely, a selection of reading and writing of horizontal scanning lines).

The address control circuit 218 outputs a write address of a single address with respect to a normal single pixel to the line memory 201 and outputs a read address for reading a single pixel enlarged by the zooming ratio $\beta/\alpha$ at $\beta/\alpha$ times. The line memory 201 at a front stage thereof has written therein the luminance data on a single horizontal scanning line by a normal writing address and reads out by the reading address higher than the zooming ratio at $\beta/\alpha$ times whereby the enlargement process of $\beta/\alpha$ in the horizontal direction is carried out. The address control circuit 218 outputs the reading and writing addresses to the line memory positioned at the second stage and also the writing address and reading address of a single address with respect to a single pixel.

The inverse number $\alpha/\beta$ of the zooming ratio $\alpha/\beta$ is supplied from the control circuit 107 as the magnification data to the data selecting circuit 219 and coefficient generating circuit 207. Based upon this magnification data, the address generating unit 206 performs a calculation of Y = INT2(n $\alpha/\beta$) of the equation (14), and calculates values of Y and Y−1 so as to be outputted as address signals 211 and 212 to the line memories 201 and 202. In response to these address signals 211 and 212, the line memories 201 and 202 supply the luminance data "Dy" of Y-th horizontal scanning line designated by these addresses to one input of a multiplier 204 as a signal 214 and also the luminance data "$D_{Y-1}$" of (Y−1) the horizontal scanning line as a signal 213 to the one input of the multiplier 204. On the other hand, the calculation on X = n $\alpha/\beta$ INT1(n $\alpha/\beta$) for the equation (13) is performed in the coefficient generating unit 207 so as to generate values of coefficients X and 1−X, which are supplied to another input of each of the multipliers 203 and 204 as signals 216 and 217.

As a consequence, a calculation result of $(1-X)D_{Y-1}$ is obtained in the multiplier 203 by multiplying the luminance signal $D_{Y-1}$ of the horizontal scanning line by (1−X) which is outputted to an adder 205. Also, in the other multiplier 204, a calculation result of $(XD_Y)$ is obtained by multiplying the luminance signal $D_Y$ of the horizontal scanning line by (X) which is outputted to the adder 205. Accordingly, a value of $D'n = XD_Y - (1-X)D_{Y-1}$ is produced from the output of adder 205 so that the horizontal scanning lines used for the interpolation in the vertical direction are synthesized in accordance with the above operation and the inner interpolation is completed as represented in FIGS. 7 and 8.

A series of luminance signal data for the horizontal scanning lines which have been interpolated in the vertical direction is sequentially inputted into sample and hold circuits 221 and 222 every single horizontal scanning line. Thus, the luminance data signal which has been inputted into these sample/hold circuits 221 and 222 every single horizontal scanning line is interpolated in the horizontal direction for predetermined pixels of the horizontal scanning line. In other words, the data selecting circuit 226 outputs the coefficients Y' and Y'−1 to the sample/hold circuits 221 and 222, reads out the luminance signal data on the specific pixel within a single horizontal scanning line designated by the address and then outputs the luminance signal data to the multipliers 223 and 224. On the other hand, the coefficient generating unit 227 calculates the coefficients 1−X' and X' and outputs them to the multipliers 203 and 204 and also multiplies the pixels read out at the above-described designation addresses Y' and Y'−1 by the coefficients 1−X, X. The multiplied values obtained from these multipliers 223 and 224 are added to each other to perform the calculation $D'n = X'Dr + (1−X')Dr_{−1'}$ and then the interpolation in the horizontal direction at the specific pixel within a single horizontal scanning line is accomplished in a similar manner to the interpolation in the vertical direction as represented in FIGS. 7 and 8.

Referring now to FIGS. 6C to 6O, a specific example is explained of a luminance signal to be processed in the luminance signal processing circuit positioned at the upper part of FIG. 6B with the reading and writing timings are set to $\beta/\alpha = 2$.

Figure 6C:
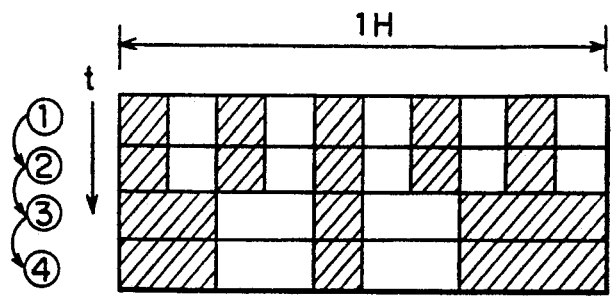
FIGS. 6C to 6D are examples of data and timing of the block diagram of FIG. 6B.

As shown in FIG. 6C, to an input terminal of the line memory 201, both the luminance signals of the horizontal scanning line which have not yet been processed, indicated by ① and continued ③, and derived from the above-described sensor 101, ani the luminance signal which has been enlarged two tines in the vertical direction during the read out operation are inputted as the horizontal scanning lines ①→② ③=④. It should be noted that the luminance signals of the horizontal scanning line have either a value of white, or a value of black (namely, digital value of 100 or 0) for the sake of simple explanation.

Figure 6D:
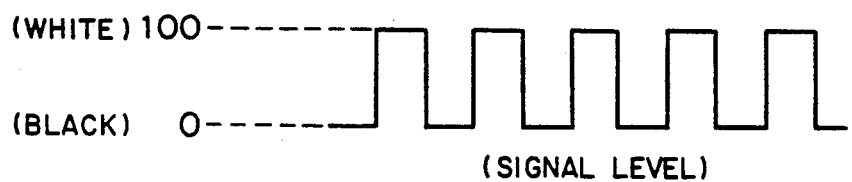
Figure 6E:
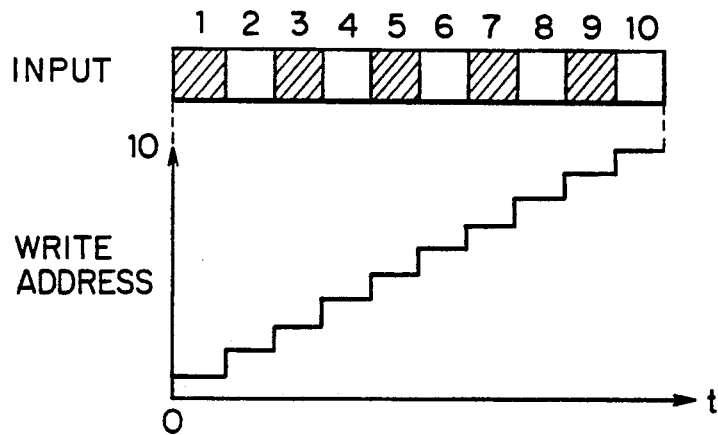
Figure 6F:
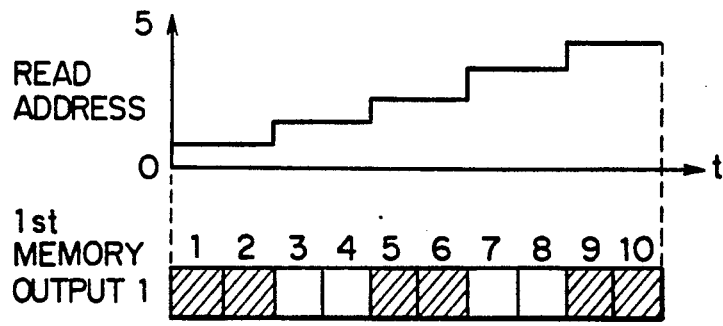
Figure 6G:
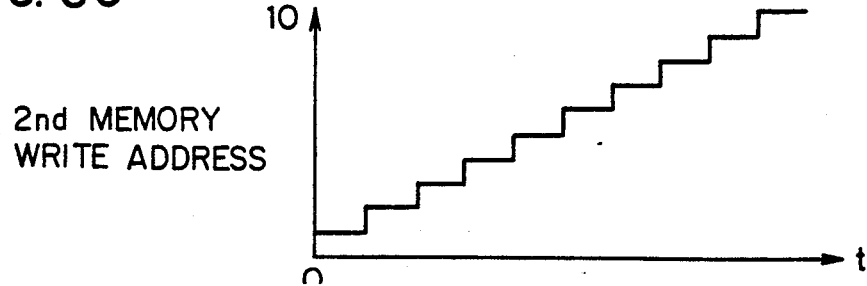
Figure 6H:
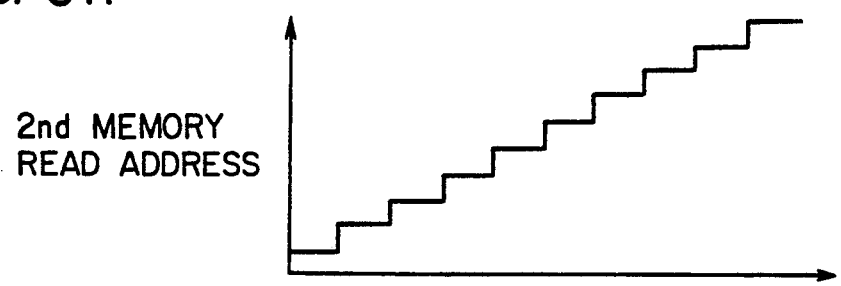
Figure 6I:
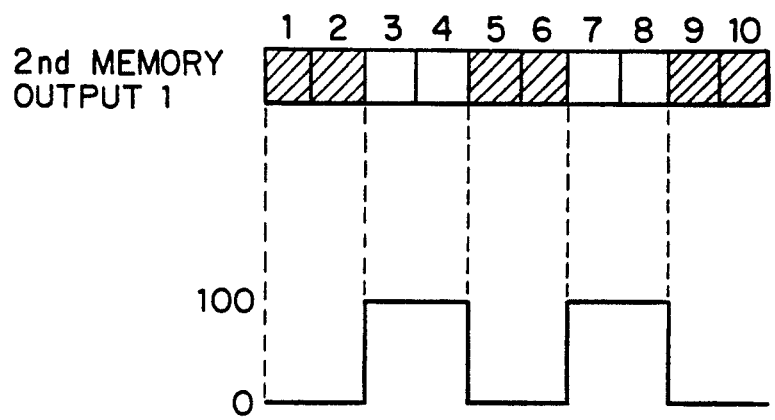
Figure 6J:
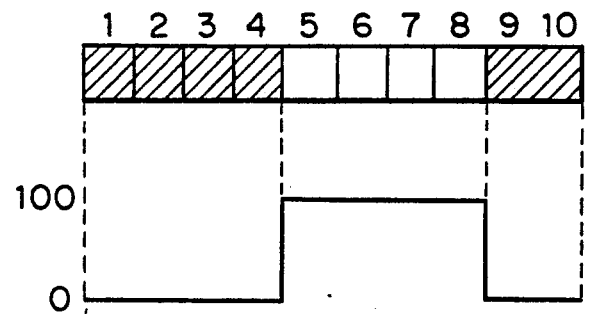

Here, assuming now that the input to the first stage line memory 201 is equal to the luminance signal of the horizontal scanning line ① shown in FIG. 6C, the black/white luminance data as represented in FIG. 6D are written into the first stage line memory 201 in accordance with the write address with the normal timing as illustrated in FIG. 6E. Since the address control circuit 218 supplies the reading address with the timing multiplied by the zooming ratio of $\beta/\alpha$ to this first stage line memory 201, the luminance signal data of the horizontal scanning line has been enlarged two times in the horizontal direction as shown in FIG. 6F. This signal data is supplied to the multiplier 204 and also to the second stage line memory 202. This value is read/write-processed at the normal read/write addresses (FIGS. 6G and 6H) derived from the address control circuit 218. Thus, the luminance signal data which has been produced by enlarging the first-mentioned luminance signal of the horizontal scanning line ① two times along the horizontal direction, is delayed by 1 horizontal scanning period (1H) and then a signal shown in FIG. 6I is outputted. At this time, the first stage line memory 201 outputs a signal (FIG. 6J) which is produced by enlarging the luminance signal of the horizontal scanning line ③ two times in the horizontal direction. These signals shown in FIGS. 6I and 6J are multiplied by the coefficients in the relevant multipliers 204 and 203 and then added to each other so that a signal shown in FIG. 6K is generated.

Figure 6K:
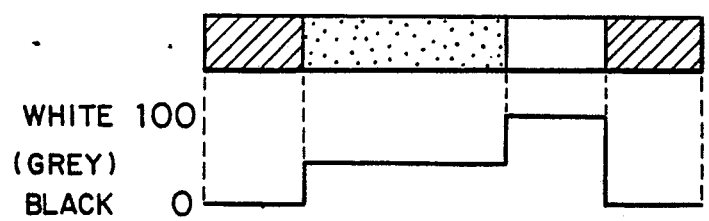
Figure 6L:
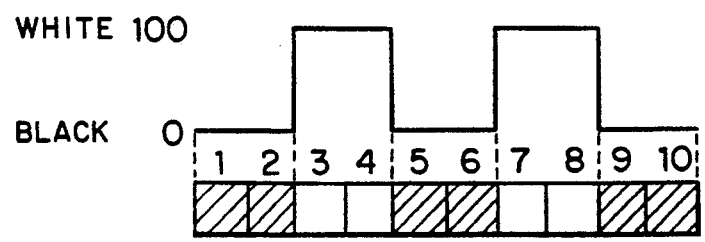

The signal shown in FIG. 6K corresponds to the signal of ②' which is obtained by interpolating the luminance signal ① of the horizontal scanning line and the luminance signal ③ of the horizontal scanning line in the vertical direction. As a result, a signal series becomes ①→②→③. The luminance signal enlarged two times in the vertical direction during the reading operation of the sensor 101 is processed in the above-described process so that a series of luminance signals which have been furthermore interpolated in the vertical direction and enlarged two times in the horizontal direction is obtained.

Figure 6M:
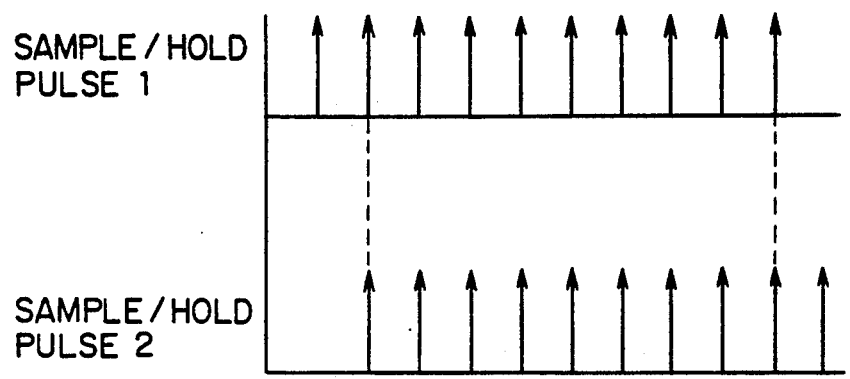
Figure 6N:
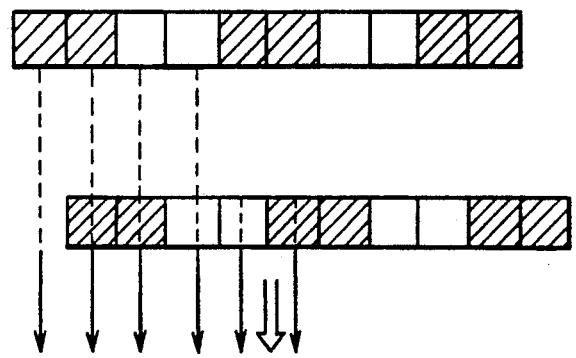
Figure 6O:
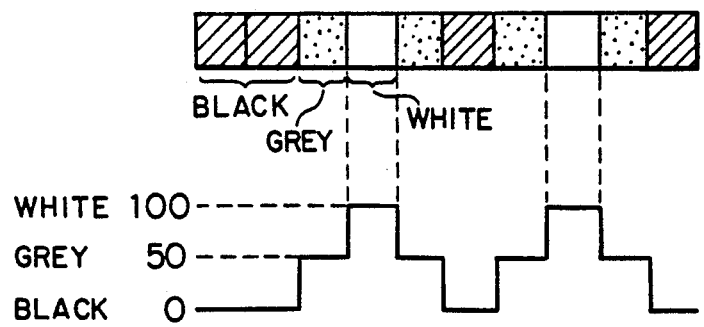

This resultant signal ① is further interpolated in the horizontal direction in the post stage circuit. Considering now a signal shown in FIG. 6L which is produced by enlarging the luminance signal ① of the horizontal scanning line, this signal is inputted into the first stage and second stage sample/hold circuits 221 and 222 (constructed with shift registers or the like) so that sample and hold pulses shown in FIG. 6M are obtained. Thus, the weighted average calculations are performed in the multipliers 223, 224 and adder 225 for every single pixel of the sample/hold pulses in the horizontal direction which is similarly carried out in the prestage circuit so that a luminance signal interpolated in the horizontal direction as shown in FIG. 6O is produced.

The horizontal enlargement, and the interpolation both in the horizontal and vertical directions have been explained with respect to the luminance signal data. The horizontal enlargement, generation of the coefficients C, C−1, X, X−1, the vertical interpolation, generation of the coefficients C', C'−1, 1−X', X', and also the horizontal interpolation are performed with respect to the color signal data in the same circuit arrangement employed in the lower half. Since these processing operations are identical to that of the luminance signal data, no further explanation is made.

Figures 9A, 9B:
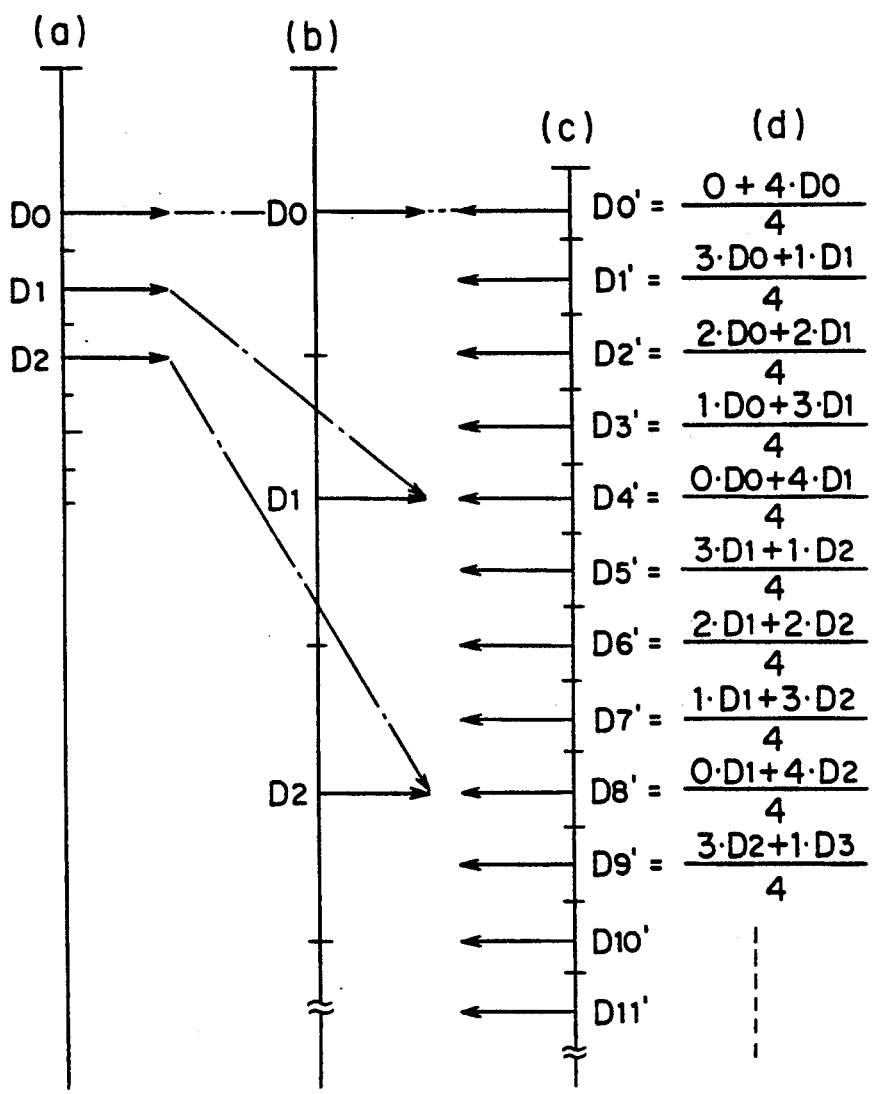
FIGS. 9A and 9B represents data interpolation when a zooming ratio $\beta/\alpha$ is changed to 4/1.

FIGS. 9A and 9B represent a linear interpolation in a case such that the zooming ratio of $\beta/\alpha$ is set to 4/1 (namely 4 times). Since $\alpha/\beta = \frac{1}{4}$, interpolated picture data (d) may be obtained with respect to the original data (a).

For instance, as shown in FIG. 9B, the inverse number $\alpha/\beta$ of the zooming ratio may be outputted from the control circuit 107 shown in FIG. 4 as 8-bit data whose allocation is represented in FIG. 9B. It should be noted that the greater the value of $\beta$ becomes, the changing ratio becomes smooth and the precision of the continuous zooming operation becomes high.

Figure 10:
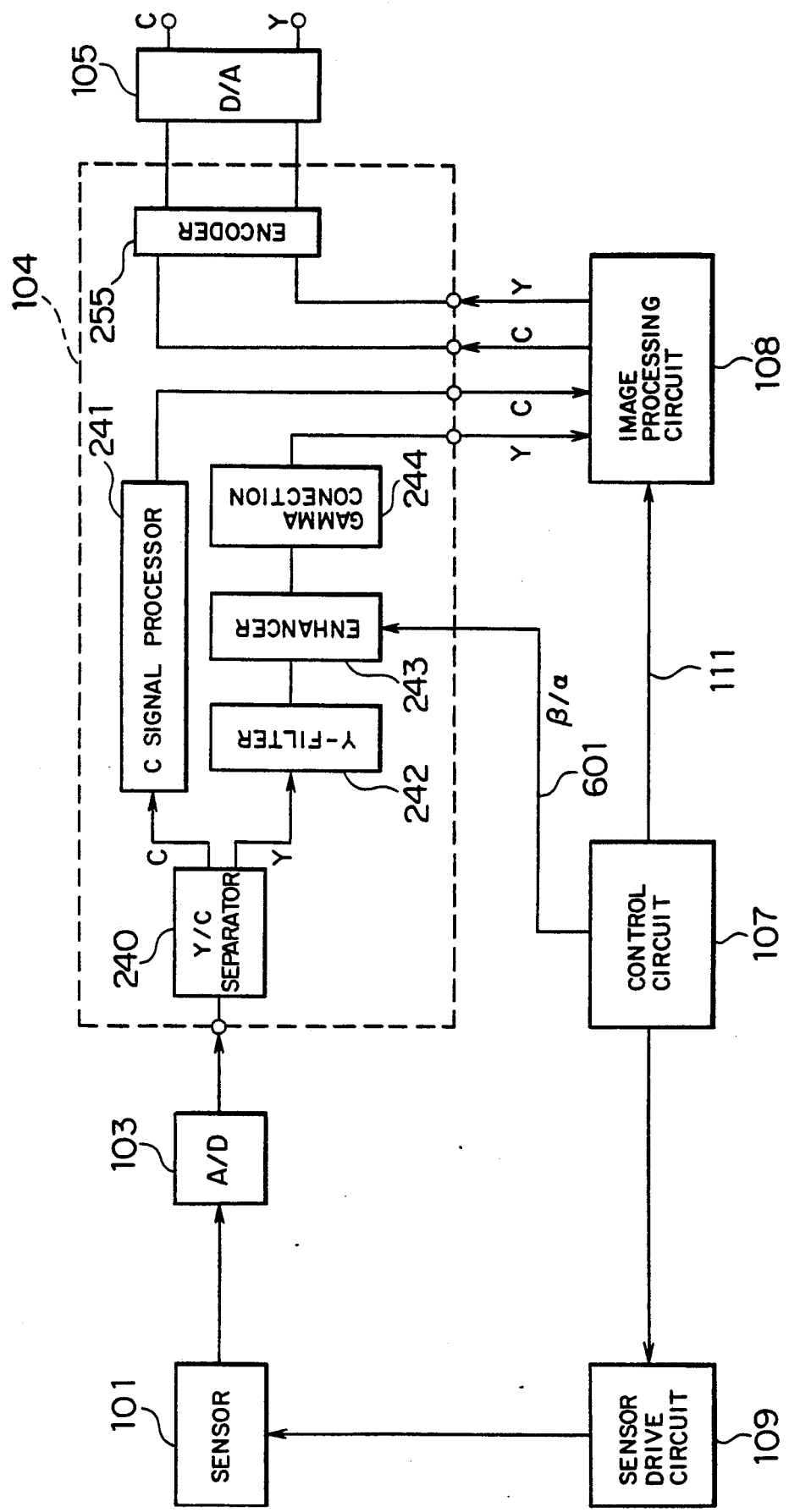
FIG. 10 is a schematic block diagram of another embodiment of the invention including an enhancer.

A second preferred embodiment of the present invention will now be explained with reference to FIGS. 10, 11 and 12. The second preferred embodiment is directed to a video camera apparatus capable of adjusting an amount of enhancement in connection with a zooming ratio. In the video camera apparatus shown in FIG. 10, there are the same circuit arrangements as those of the first preferred embodiment shown in FIG. 4 other than a means for inputting data 601 indicative of the zooming ratio $\beta/\alpha$ outputted from the control circuit 107 to the digital signal processing circuit.

That is to say, an enhancer 243 is interposed between a Y-filter 242 and a gamma correction circuit 244. The Y-filter receives a Y signal derived from a Y/C separating circuit 240 employed in a digital signal processing circuit 104 shown in FIG. 10. A luminance signal which is to be supplied to an image processing circuit 108 is enhanced by the enhancer 243.

Figure 11:
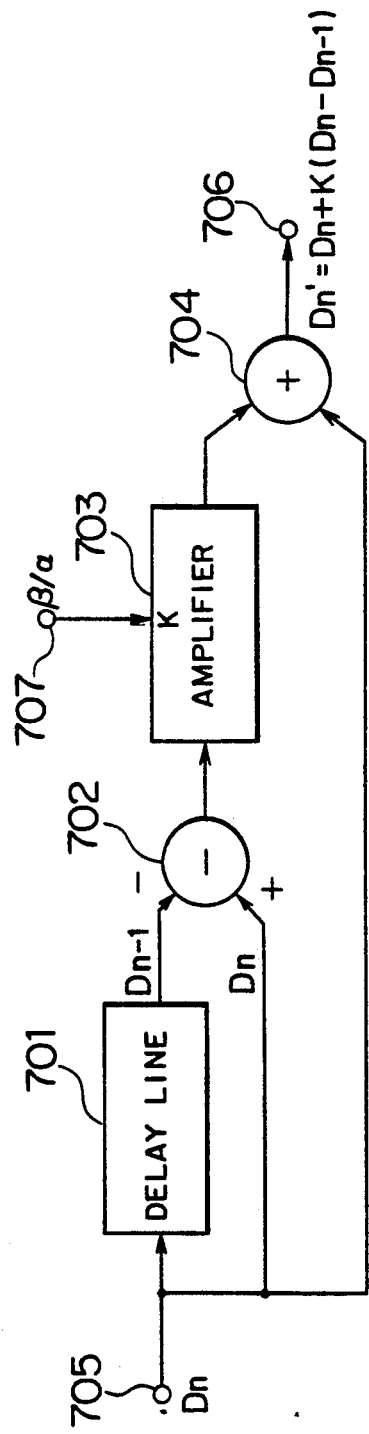
FIG. 11 is a schematic block diagram of the enhancer of FIG. 10.
Figure 12:
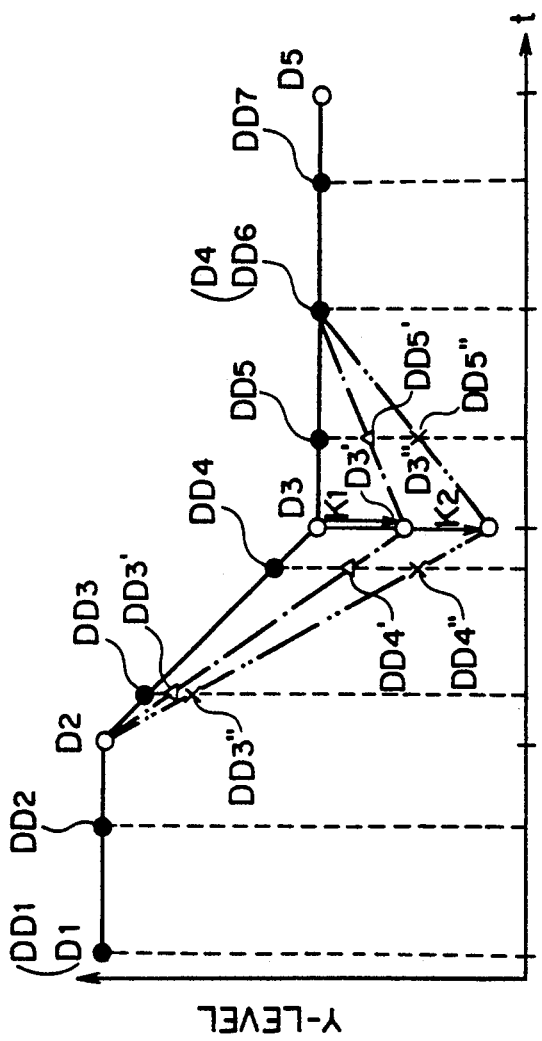
FIG. 12 represents a sample of an enhanced interpolation signal produced by the embodiment of FIG. 10.

In FIG. 11, there is shown a basic arrangement of the enhancer 243. In this arrangement, reference numeral 701 indicates a delay line; reference numeral 702 denotes a subtracter; reference numeral 703 represents an amplifier with k magnification; and reference numeral 704 represents an adder. Video data Dn inputted from an input 705 is subtracted by video data $D_{n-1}$ which has been delayed by the delay line 701 in the subtracter 702 and thereafter the subtracted data is amplified by k magnification in the amplifier 703 and further is added to the above-described video data Dn in the adder 704 to produce enhanced video data (video data which has an enhanced contour) Dn' is outputted from an output 706. As a result, the enhanced video data Dn' is given by the following equation (15):

$$D'n = Dn + K(Dn - D_{n-1}) \quad (15)$$

In other words, changing the amount of enhancement corresponds to changing the value of the value of k defined in the equation (15). Based upon the above-described operation, the video camera apparatus according to the second preferred embodiment will now be explained with reference to FIG. 12. In FIG. 12, an abscissa represents a timing of video data, whereas an ordinate denotes a density level of this video data. Assuming now that $D_2$ and $D_3$ having changes in the density levels are employed and the amount of enhancement ($K = K_1$, video data $D_{3'}$) shown in FIG. 12 is obtained. Similarly, assuming now that $K = K_2$, video data $D_{3''}$ is obtained. With employment of these data $D_{3'}$ and $D_{3''}$, data having an enlarged zooming ratio and interpolated is given as follows: $DD_{3'}$, $DD_{3''}$; $DD_{4'}$, $DD_{k''}$; $DD_{5'}$, $DD_{5''}$, so that interpolated data whose density levels are different from each other are obtained.

As a consequence, since the amount "K" of enhancement is set to the amplifier 703 in accordance with the zooming ratio of $\beta/\alpha$, the amount of enhancement for the video data which has not yet been enlarged and interpolated may be varied. With the above-described enhancement, deterioration in sharpness (resolution) caused by the inner interpolation may be suppressed.

Figure 13:
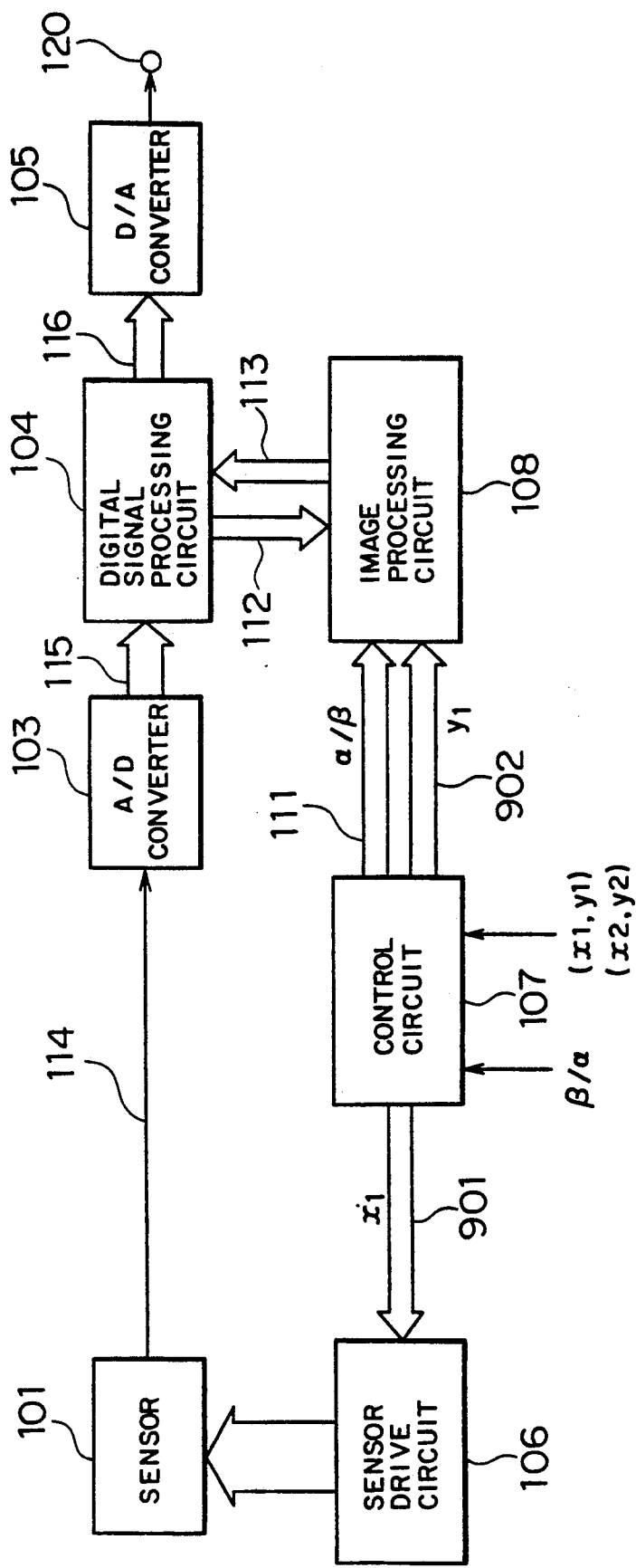
FIGS. 13 and 14 are schematic block diagrams of another embodiment of the invention having a zoom function in a specific position in an imaging screen.
Figure 14:
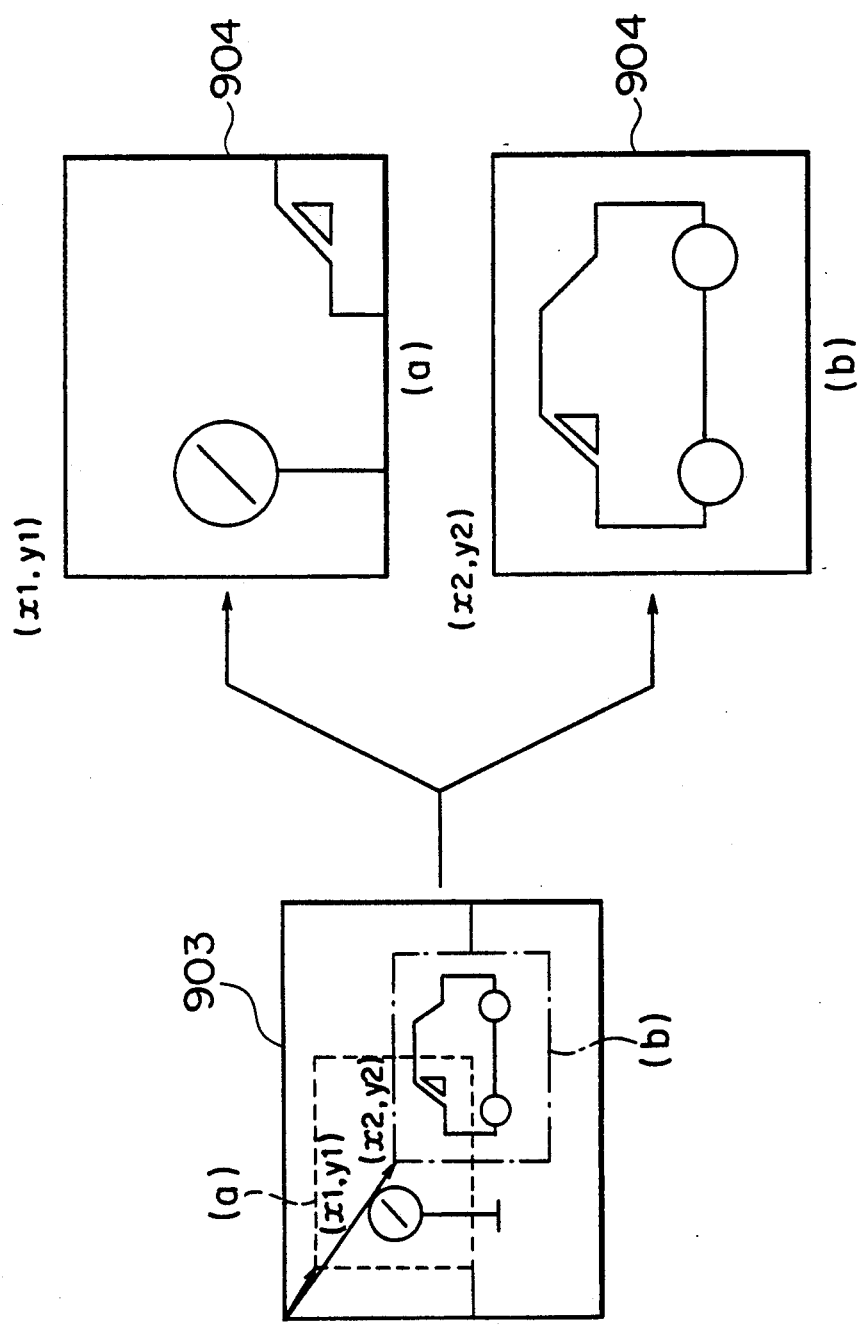

FIGS. 13 and 14 represent a third preferred embodiment of the present invention, which will now be described. The third preferred embodiment is directed to a video camera apparatus in which an area of a video signal read out during a zooming operation may be freely selected within a range of a sensor.

In FIG. 13, when a zooming ratio $\beta/\alpha$, and a coordinate $(X_1, Y_1)$, or $(x_2, y_2)$ of an arbitrary read starting position within an image are inputted into a control circuit 107, magnification data 902 $(\alpha/\beta)$ and also a read starting address 902 ($y_1$) in the horizontal direction are supplied from the control circuit 107 to the image processing circuit 108 whereas a read starting address 901 ($x_1$) in the vertical direction is outputted to a sensor drive circuit 106. These circuit arrangements are different from those of the first preferred embodiment shown in FIG. 4 and the remaining circuit arrangements shown in FIG. 13 are the same as those of FIG. 4.

FIG. 14 is an explanatory diagram of the third preferred embodiment when the zooming ratio $\beta/\alpha$ is equal to 2 (two times). In this drawing, reference numeral 903 indicates an image focused on a light receiving plane of a sensor and reference numeral 904 represents a monitor screen of an image signal which has been enlarged and interpolated. When a region (a) of the light receiving plane of the sensor is zoomed two times assuming now that a starting address of this region (a) is $(x_1, y_1)$, address data corresponding to $y_1$ is given to the read starting address 901 in the vertical direction and also address data corresponding to $X_1$ is given to the read starting address 902 in the horizontal direction. Accordingly, a read starting line of the sensor 101 is selected in the vertical direction, starting data Dy, Dc for enlargement and interpolation are selected in the horizontal direction, and an image as shown in (a) of the monitor screen 904 is outputted. Similarly, when a region (b) of the light receiving plane of the sensor 101 is zoomed, address data corresponding to $y_2$ is given to the vertical read starting address and address data corresponding to $X_2$ is given to the horizontal read starting address so that an image represented in an area (b) of the monitor screen 904 may be outputted.

Figure 15:
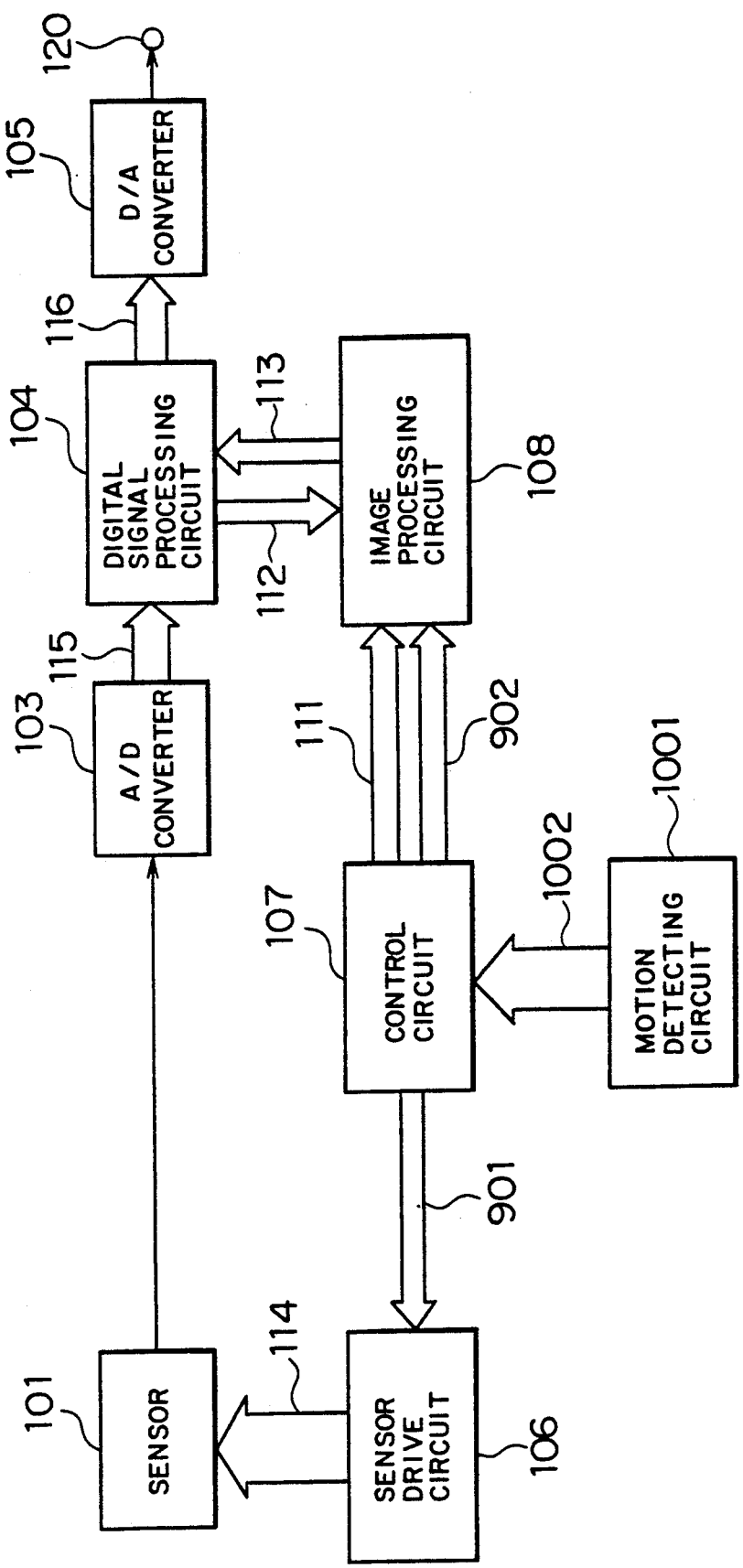
FIGS. 15 and 16 illustrates another embodiment of the invention equipped with a motion detecting circuit; and, FIGS. 17 and 18 illustrates a further embodiment of the invention for changing a zooming ratio in both the horizontal and vertical directions.
Figure 16:
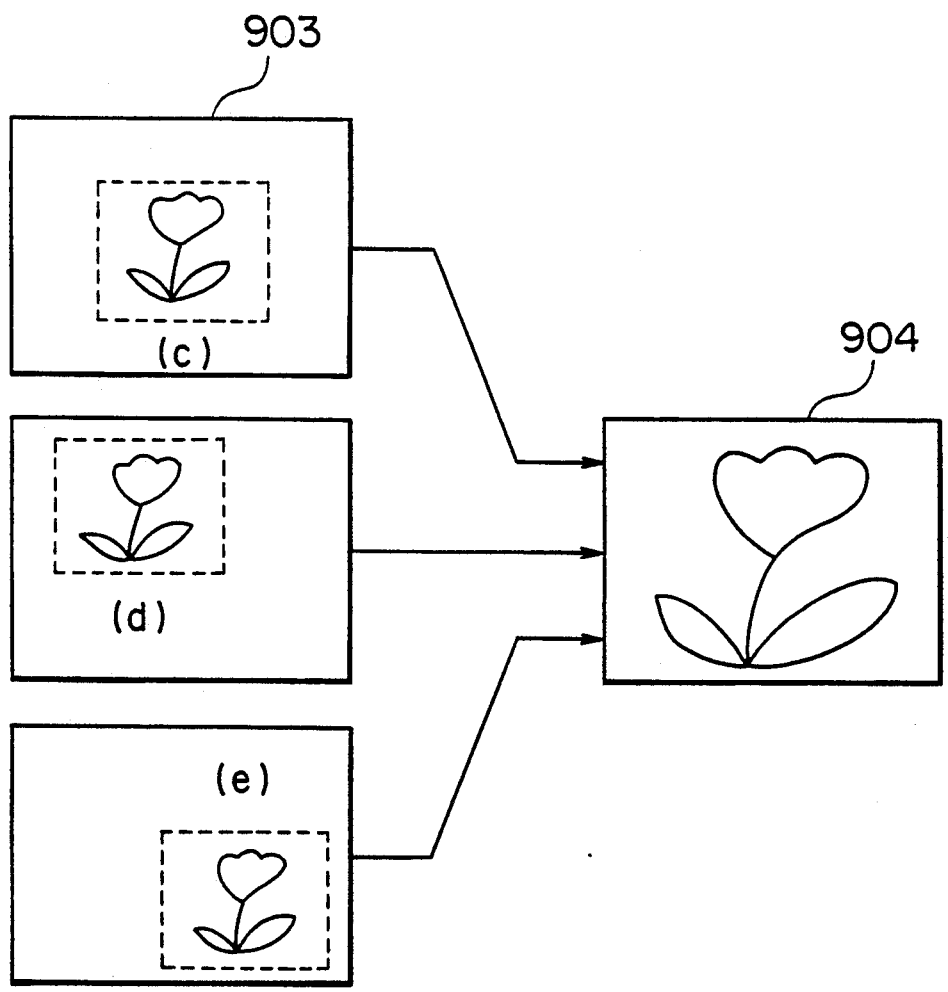

FIG. 15 represents a fourth preferred embodiment of the present invention. This fourth preferred embodiment corresponds to the third preferred embodiment shown in FIG. 13 in combination with a motion detecting circuit 1001 for detecting movement of an image. The fourth preferred embodiment is directed to a video camera apparatus having a correcting function of image movement. FIG. 16 is an explanatory diagram of the fourth preferred embodiment when the zooming ratio $\beta/\alpha$ is equal to 2 (two times).

In FIGS. 15 and 16, when a region (c) of the sensor light receiving plane 903 is zoomed and a motion phenomenon happens to occur due to vibrations resulting in an object to be imaged which was present at the region (c) being moved to either a region (d), or (e), the motion detecting circuit 1001 detects both a moving direction and a travel distance as a moving vector. The moving vector information 1002 is inputted to the control circuit 107 so that both the horizontal and vertical read starting addresses as represented in the third preferred embodiment are produced and a stable image can be continuously outputted as shown in the monitor screen 904 of FIG. 16.

Figure 17:
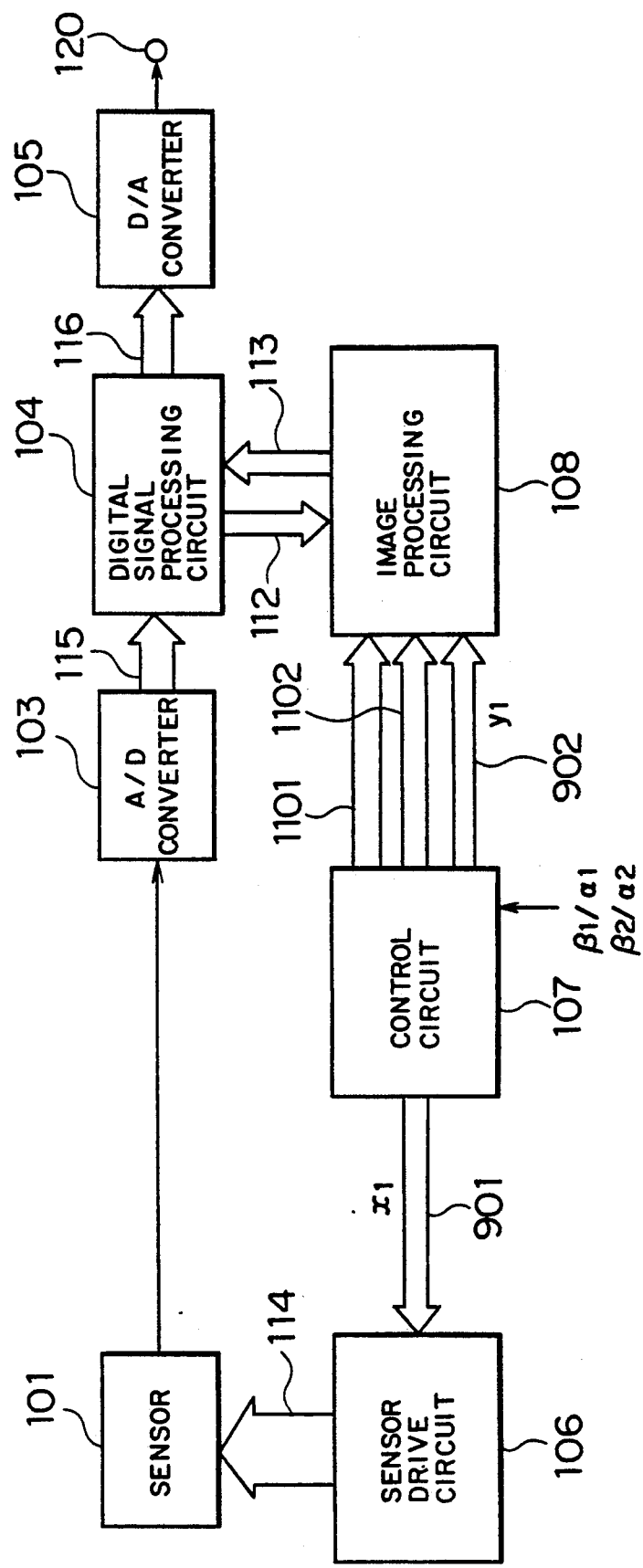
Figure 18:
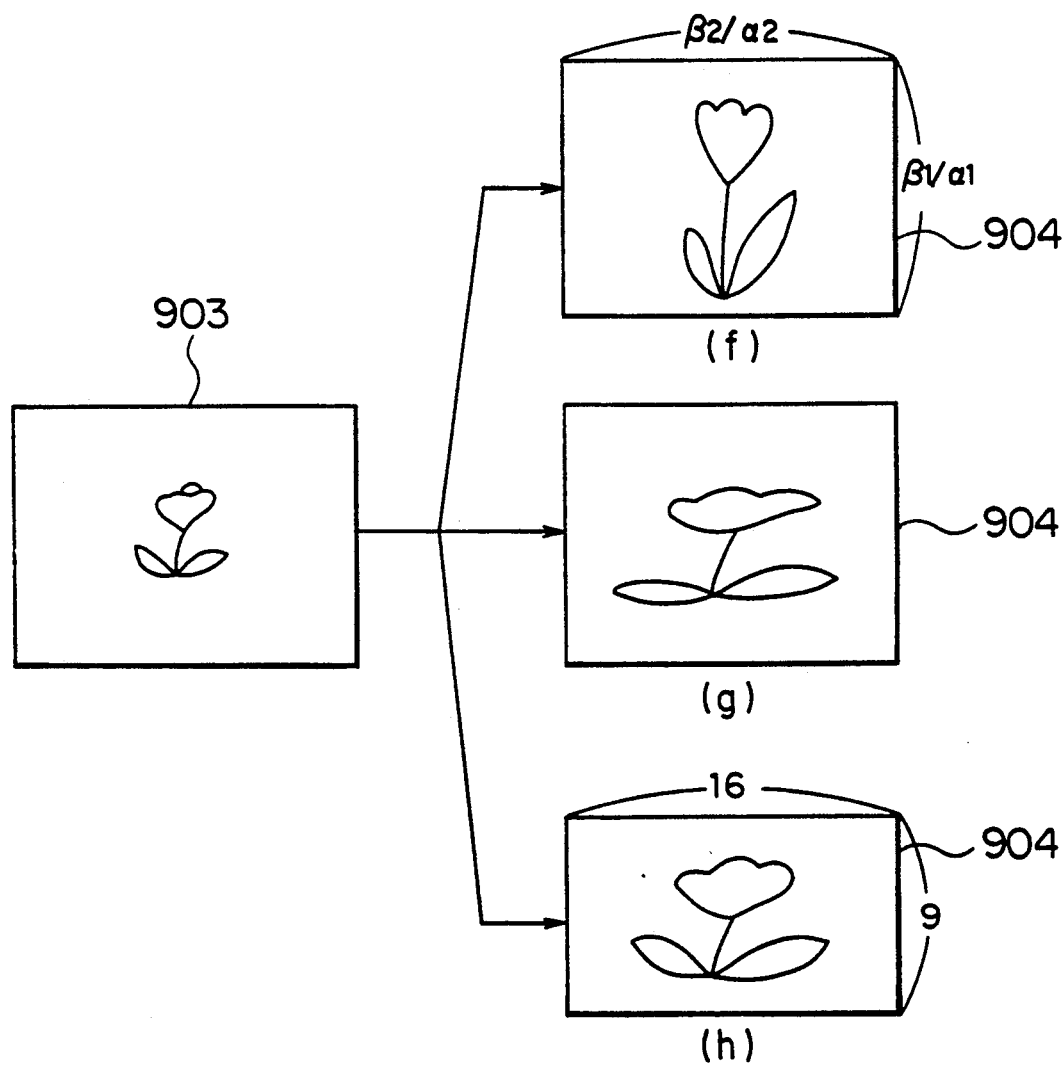

FIG. 17 represents a fifth preferred embodiment according to the present invention. This fifth preferred embodiment is related to a video camera apparatus capable of zooming an image under different zooming ratios in vertical and horizontal directions. In FIG. 17, there is a only difference that zooming ratio data 1101 and 1102 may be set to different values but other operations of the fifth preferred embodiment are identical to those of the first preferred embodiment shown in FIG. 4. FIG. 18 is an explanatory diagram of the fifth preferred embodiment.

In FIG. 18, it is assumed that an image has been focused on the light receiving plane 903 of the sensor 101. At this time, the zooming ratio data of $\beta_1/\alpha_1$ and $\beta_2/\alpha_2$ are set as 1101 and 1102 in the vertical and horizontal directions and then are inputted from the control circuit 107 to the image processing circuit 108 so that as shown in FIGS. 18(f) and (g) images with having different zooming ratios in the horizontal and vertical directions may be outputted. As shown in FIG. 18(h), an aspect ratio may be varied in order to be adapted to a wide screen camera of 16:9.

In accordance with the above-described preferred embodiments, when the new picture data is interpolated between the present picture data with employment of the inverse number $\alpha/\beta$ with respect to the zooming ratio $\beta/\alpha$, a complex data calculation is no longer required and the data calculation may be performed with better precision. As a result, the entire circuit arrangement becomes simpler and may be readily constructed with a hardware.

Since the amount of enhancement may be changed in connection with the zooming ratio, deterioration in sharpness (resolution) caused by the interpolation may be suppressed.

Furthermore, since the read starting address for the zooming operation may be freely selected, when, for instance, the starting address is controlled based upon the motion vector information, the image motion phenomenon may be corrected.

Furthermore, since the zooming ratios in the vertical and horizontal directions may be freely set, a specific imaging effect such as aspect ratio variation may be additionally achieved.

We claim:

1. A video camera apparatus comprising:
   a control circuit for producing a control signal which is an integer and a function of $n \times \alpha/\beta$ where n is a number which increases by one for every horizontal period of the video camera apparatus and $\alpha/\beta$ is an inverse number of a selected zooming ratio $\beta/\alpha$;
   a sensor having imaging surface;
   a sensor drive circuit for driving said sensor according to said control signal from said control circuit so as to output a sensor read signal when the integer which is a function of $n \times \alpha/\beta$ increases;
   a digital signal processing circuit for separating the sensor read signal derived from said imaging surface into a luminance signal and a color signal to be outputted therefrom; and,
   an image processing circuit for receiving both the luminance signal and the color signal from said digital signal processing circuit and for performing interpolation in vertical and horizontal directions and also an enlargement in the horizontal direction of said luminance signal and said color according to a fraction which is a function of $n \times \alpha/\beta$.

2. A video camera apparatus as claimed in claim 1, wherein said image processing circuit comprises:
   a horizontal time axis converting unit for executing a horizontal time axis conversion by receiving said luminance signal and said color signal into a first line memory;
   a vertical interpolating unit for performing vertical interpolation on an output from said horizontal time axis converting unit and a signal which is produced by delaying said output by a second line memory;
   a horizontal interpolating unit for performing horizontal interpolation on an output from said vertical interpolating unit; and,
   a control unit for controlling said horizontal time axis converting unit, said vertical interpolating unit and said horizontal interpolating unit based upon the control data $\alpha/\beta$.

3. A video camera apparatus as claimed in claim 1, wherein said image processing circuit includes a luminance signal processing unit for performing an enlargement in the horizontal direction and interpolation in both the horizontal and vertical directions by inputting therein said luminance signal, and also a color signal processing unit for executing an enlargement in the horizontal direction and interpolation in both the horizontal and vertical directions by inputting therein said color signal, said luminance signal processing unit having:
   a first data selecting circuit for producing addresses:

$Y = INT2 (n \cdot \alpha/\beta)$ and $Y-1$ ("n" being an integer, and INT2( ) being an integer obtained by counting fractions as 1) for designating a luminance pixel series in the vertical direction by inputting said control data $\alpha/\beta$ therein;
   a first coefficient generating unit for generating an interpolation coefficient:

$X = n \cdot \alpha/\beta - INT1(n \cdot \alpha\beta)$ and $1-X$ ("n" being an integer and INT1( ) being an integer obtained by cutting fragments) by inputting said control data $\alpha/\beta$ therein;
   an address control circuit capable of out-putting a read address to read 1 address every $\beta/\alpha$ times;
   a first line memory connected in series therewith, for successively storing luminance signal data every 1 horizontal scanning line, in response to addresses Y and $Y-1$ derived from said first data selecting circuit, for outputting line data on the luminance signals designated by said addresses, and also read by read addresses supplied from said first address control circuit every said $\beta/\alpha$ times;
   a second line memory connected to said first line memory as a post stage circuit;
   first and second multipliers for inputting therein the line data on the luminance signals outputted from said first and second line memories and also said coefficients X and $1-X$ derived from said first coefficient generating unit so as to be multiplied with each other, and for outputting multiplied values;
   a first adder circuit for adding said multiplied values of said first and second multipliers to each other so as to produce a vertically-interpolated luminance signal;
   a second data selecting circuit for inputting therein said control data $\alpha/\beta$ so as to produce addresses for designating a luminance pixel in the horizontal direction:

$Y' = INT2(n \cdot \alpha/\beta)$ and $Y'-1$ ("n" being an integer, and INT2( ) being an integer obtained by counting fragments as 1)
   a second coefficient generating unit for inputting therein said control data $\alpha/\beta$ so as to produce coefficients of interpolation in the horizontal direction:

$X' = n \cdot \alpha/\beta - INT1(n \cdot \alpha/\beta)$ and $1-X'$ ("n" being an integer and INT1( ) being an integer obtaining by cutting off fragments)
   first and second sample/hold circuits connected in series with said adder circuit, for inputting therein the luminance signal data derived from said adder circuit every pixel of 1 horizontal scanning line, and also for outputting pixel data designated by addresses Y' and Y'−1 in response to the addresses Y' and Y'−1 from said second data selecting circuit;

third and fourth multipliers for inputting therein both said coefficients X' and 1−X' derived from said second coefficient generating unit, and also for multiplying said coefficients by pixel data outputted from said first and second sample/hold circuits; and also a second adder circuit for adding both of the outputs from said third and fourth multipliers so as to output a horizontally-interpolated luminance signal;

said color signal processing unit having;

a third data selecting circuit for producing addresses:

$$C = INT2(n \cdot \alpha/\beta) \text{ and } C-1$$

("n" being an integer, and INT2( ) being an integer obtained by counting fragments as 1) for designating a luminance pixel series in the vertical direction by inputting said control data $\alpha/\beta$ therein;

a third coefficient generating unit for generating an interpolation coefficient in the vertical direction:

$$X = n \cdot \alpha/\beta - INT1(n \cdot \alpha/\beta) \text{ and } 1-X$$

("n" being an integer and INT1( ) being an integer obtained by cutting off fragments) by inputting said control data $\alpha/\beta$ therein;

a second address control circuit capable of outputting a read address to read 1 address every $\beta/\alpha$ times;

a third line memory connected in series therewith, for successively storing color signal data every horizontal scanning line, in response to addresses C and C−1 derived from said third data selecting circuit, for outputting line data on the luminance signals designated by said addresses, and also read by read addresses supplied from said first address control circuit every said $\beta/\alpha$ times;

a fourth line memory connected to said third line memory as a post stage circuit;

fifth and sixth multipliers for inputting therein the line data on the color signals outputted from said third and fourth line memories and also said coefficients C and C−1 derived from said third coefficient generating unit so as to be multiplied with each other, and for outputting multiplied values;

a third adder circuit for adding said multiplied values of said fifth and sixth multipliers to each other so as to produce a vertically-interpolated color signal;

a fourth data selecting circuit for inputting therein said control data c/8 so as to produce addresses for designating a color pixel in the horizontal direction:

$$C' = INT2(n \cdot \alpha/\beta) \text{ and } C'-1$$

("n" being an integer, and INT2( ) being an integer obtained by counting fragments as 1)

a fourth coefficient generating unit for inputting therein said control data o/8 so as to produce coefficients of interpolation in the horizontal direction:

$$X' = n \cdot \alpha/\beta - INT1(n \cdot \alpha/\beta) \text{ and } 1-X'$$

("n" being an integer and INT1( ) being an integer obtaining by cutting off fragments)

third and fourth sample/hold circuits connected in series with said third adder circuit for inputting therein the color signal data derived from said third adder circuit every pixel of 1 horizontal scanning line, and also for outputting pixel data designated by addresses C' and C'−1 in response to the addresses C' and C'−1 from said third data selecting circuit;

seventh and eighth multipliers for inputting therein both said coefficients X' and 1−X' derived from said second coefficient generating unit, and also for multiplying said coefficients by pixel data outputted from said third and fourth sample/hold circuits; and also a fourth adder circuit for adding both of the outputs from said seventh and eighth multipliers so as to output a horizontally interpolated luminance signal.

4. A video camera apparatus as claimed in claim 1, wherein said digital signal processing circuit is equipped with an enhancer for performing an enhancing process on the luminance signal based on the control data $\alpha/\beta$.

5. A video camera apparatus as claimed in claim 1, wherein said control circuit outputs a read starting address in the vertical direction to a sensor drive circuit based upon an inputted arbitrary image reading position, and also outputs a read starting address in the horizontal direction to an image processing circuit.

6. A video camera apparatus as claimed in claim 1, further comprising a motion detecting circuit for detecting a motion of an object to be imaged within an image, an output of said motion detecting circuit being connected to said control circuit.

7. A video camera apparatus as claimed in claim 1, wherein said control circuit controls said sensor drive circuit based upon inputted zooming ratios in arbitrary vertical and horizontal directions in order to drive said sensor based on said zooming ratio in the vertical direction, whereby a sensor read signal which has been enlarged in the vertical direction is outputted, said control circuit further inputs data on said inputted zooming ratios in the vertical and horizontal directions to an image processing circuit, and also said image processing circuit performs an enlargement in the horizontal direction and interpolation in both the vertical and horizontal directions.

8. A video camera apparatus as claimed in claim 3, wherein the sensor having an imaging surface is constructed of a solid-state imaging element.

9. A video camera apparatus as claimed in claim 3, wherein said control circuit controls said sensor drive circuit based on an inputted vertical arbitrary zooming ratio $\alpha 1/\beta 1$ and a horizontal arbitrary zooming ratio $\beta 2/\alpha 2$, wherein $\beta 1/\alpha 1$ and $\beta 2/\alpha 2$ have different values, so as to output a sensor read signal from said sensor which is enlarged vertically by $\beta 1/\alpha 1$ in accordance with a control of said sensor drive circuit, said control circuit controlling said image processing circuit based on the inputted vertical zooming ratio $\beta 1/\alpha 1$ and horizontal zooming ratio $\beta 2/\alpha 2$, said image processing circuit performing vertical interpolation based on the zooming ration $\beta 1/\alpha 1$ and performing horizontal enlarging and horizontal interpolation based on the zooming ratio $\beta 2/\alpha 2$.

10. A method for controlling a video camera apparatus having a zooming function and utilizing a sensor having an imaging surface, the method comprising the steps:

inputting an arbitrary zooming ratio of $\beta/\alpha$ and producing an inverse number of $\alpha/\beta$ as control data for the video camera apparatus;

driving the sensor in accordance with the control data $\alpha/\beta$ so as to output a sensor read signal which has been enlarged in a vertical direction in accordance with the zooming ratio of $\beta/\alpha$;

separating the sensor read signal derived from the sensor into a luminance signal and a color signal; and receiving the luminance signal and the color signal and performing interpolation in vertical and horizontal directions and also an enlargement in the horizontal direction of the luminance signal and the color signal data according to a fractional term and an integer term of a quantity $n \times \alpha/\beta$ where n is a number which increase by one for every horizontal period of the video camera apparatus.

11. A method as claimed in claim 10, wherein the step of separating the sensor read signal derived from the sensor includes utilizing a digital signal processing circuit and the step of performing interpolation and enlargement includes utilizing an image processing circuit.

12. A method as claimed in claim 10, wherein the step of performing interpolation and enlargement includes utilizing a horizontal time axis converting unit for executing a horizontal time axis conversion by receiving the luminance signal and the color signal into a first line memory, utilizing a vertical interpolating unit for performing vertical interpolation on an output from the horizontal time axis converting unit and a signal which is produced by delaying the output by a second line memory, utilizing a horizontal interpolating unit for performing horizontal interpolation on an output from the vertical interpolating unit, and controlling the horizontal time axis converting unit, the vertical interpolating unit and the horizontal interpolating unit based upon the control data $\alpha/\beta$.

* * * * *

UNITED STATES PATENT AND TRADEMARK OFFICE
CERTIFICATE OF CORRECTION

PATENT NO. : 5,253,064
DATED : October 12, 1993
INVENTOR(S) : Yamamoto, et. al.

It is certified that error appears in the above-indentified patent and that said Letters Patent is hereby corrected as shown below:

Title page, item [73], Assignee: should read--Hitachi, Ltd., Tokyo; Hitachi Video Engineering, Incorporated, Kanagawa; both of Japan--.

Signed and Sealed this

Third Day of January, 1995

*Attest:*

BRUCE LEHMAN

*Attesting Officer*    *Commissioner of Patents and Trademarks*